US012639897B2

(12) United States Patent
Lee et al.

(10) Patent No.: US 12,639,897 B2
(45) Date of Patent: May 26, 2026

(54) ELECTRONIC DEVICE AND METHOD FOR PROVIDING AR INFORMATION USING WATCH FACE IMAGE

(71) Applicant: SAMSUNG ELECTRONICS CO., LTD., Suwon-si (KR)

(72) Inventors: Kihyuk Lee, Suwon-si (KR); Jongah Kim, Suwon-si (KR); Heewoong Yoon, Suwon-si (KR); Donghan Lee, Suwon-si (KR); Gwangho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 18/495,981

(22) Filed: Oct. 27, 2023

(65) Prior Publication Data
US 2024/0119683 A1 Apr. 11, 2024

Related U.S. Application Data

(63) Continuation of application No. PCT/KR2023/013744, filed on Sep. 13, 2023.

(30) Foreign Application Priority Data

Oct. 11, 2022 (KR) ........................ 10-2022-0129913
Nov. 18, 2022 (KR) ........................ 10-2022-0155363

(51) Int. Cl.
*G06T 19/00* (2011.01)
*G06V 40/16* (2022.01)

(52) U.S. Cl.
CPC .......... *G06T 19/006* (2013.01); *G06V 40/166* (2022.01)

(58) Field of Classification Search
CPC ..... G06T 19/006; G06T 19/00; G06V 40/166; G06V 10/70; G06V 40/18; G06V 40/28;
(Continued)

(56) References Cited

U.S. PATENT DOCUMENTS 10,523,918 B2 12/2019 Peri
10,565,725 B2 2/2020 Kim et al.
(Continued)

FOREIGN PATENT DOCUMENTS

JP 6328579 B2 4/2018
KR 101330807 B1 11/2013
(Continued)

OTHER PUBLICATIONS

Search Report and Written Opinion dated Dec. 13, 2023 issued in International Patent Application No. PCT/KR2023/013744.
(Continued)

*Primary Examiner* — Motilewa Good-Johnson
(74) *Attorney, Agent, or Firm* — Nixon & Vanderhye, P.C.

(57) ABSTRACT

An augmented reality (AR) device according to an embodiment may include: a communication module comprising communication circuitry, a camera, a display, a wear detection sensor, a memory, and a processor. The memory according to an embodiment may include instructions which, when executed by the processor cause the AR device to receive, through the communication module, marker configuration information related to a display form and a display method of a watch face AR marker and configured in an electronic device. The memory according to an embodiment may include instructions which, when executed by the processor cause the AR device to detect, through the wear detection sensor, that the AR device is worn on a user's body and activate the camera. The memory according to an embodi-
(Continued)

ment may include instructions which, when executed by the processor cause the AR device to identify a watch face AR marker and a strap pointing marker included in a camera video, based on the marker configuration information configured in the electronic device. The memory according to an embodiment may include instructions which, when executed by the processor cause the AR device to determine at least one of a location, a posture, and a tilt of the electronic device, based on the identified watch face AR marker and the identified strap pointing marker. The memory according to an embodiment may include instructions which, when executed by the processor cause the AR device to output AR information corresponding to the posture or tilt, based on the location of the electronic device.

19 Claims, 12 Drawing Sheets

(58) Field of Classification Search

CPC .. G06V 20/20; G06F 1/16; G06F 3/00; G06F 3/01; G06F 3/011; G06F 3/017; H04W 4/80

See application file for complete search history.

(56) References Cited

U.S. PATENT DOCUMENTS

| | | | |
|---|---|---|---|
| 11,132,574 | B2 | 9/2021 | Kang |
| 11,935,201 | B2 * | 3/2024 | Tan ......................... G06F 3/167 |
| 11,998,090 | B1 | 6/2024 | Crews et al. |
| 12,300,096 | B2 * | 5/2025 | Choi ....................... H04W 4/80 |
| 2013/0050259 | A1 | 2/2013 | Ahn et al. |
| 2015/0338652 | A1 | 11/2015 | Lim et al. |
| 2016/0041048 | A1 | 2/2016 | Blum et al. |
| 2016/0153761 | A1 * | 6/2016 | Jing ................... G08B 21/0286 |
| | | | 324/207.19 |
| 2017/0011553 | A1 | 1/2017 | Chen et al. |
| 2017/0082982 | A1 | 3/2017 | Cho et al. |
| 2017/0085868 | A1 | 3/2017 | Kong |
| 2018/0011317 | A1 | 1/2018 | Hasegawa |
| 2018/0108147 | A1 * | 4/2018 | Kim ....................... G06F 3/0308 |
| 2018/0196505 | A1 * | 7/2018 | Nishizawa .............. G06F 3/013 |
| 2020/0074962 | A1 * | 3/2020 | Norieda ................... G06T 7/70 |
| 2020/0160082 | A1 * | 5/2020 | Kang ........................ G06T 7/73 |
| 2021/0149189 | A1 | 5/2021 | Hux et al. |
| 2021/0356743 | A1 | 11/2021 | Muldoon et al. |
| 2022/0011580 | A1 | 1/2022 | Muldoon et al. |
| 2022/0155861 | A1 * | 5/2022 | Myung ................. G06T 19/006 |
| 2022/0197394 | A1 * | 6/2022 | Ha .......................... G06F 3/016 |
| 2023/0074476 | A1 * | 3/2023 | Bae ..................... G06F 3/04847 |
| 2023/0135420 | A1 * | 5/2023 | Lee ..................... G06F 3/04817 |
| | | | 345/156 |
| 2023/0195225 | A1 | 6/2023 | Hong |
| 2024/0054694 | A1 * | 2/2024 | Lee ..................... G02B 27/017 |
| 2024/0094971 | A1 * | 3/2024 | Kim ........................ G06F 3/147 |

FOREIGN PATENT DOCUMENTS

| | | |
|---|---|---|
| KR | 10-2016-0099981 | 8/2016 |
| KR | 101802755 B1 | 12/2017 |
| KR | 10-2018-0041890 | 4/2018 |
| KR | 10-2018-0083144 | 7/2018 |
| KR | 10-2019-0140909 | 12/2019 |
| KR | 10-2212030 | 2/2021 |
| KR | 20220030774 A | 3/2022 |

OTHER PUBLICATIONS

Extended Search Report dated Aug. 11, 2025 in European Patent Application No. 23877512.6.

* cited by examiner

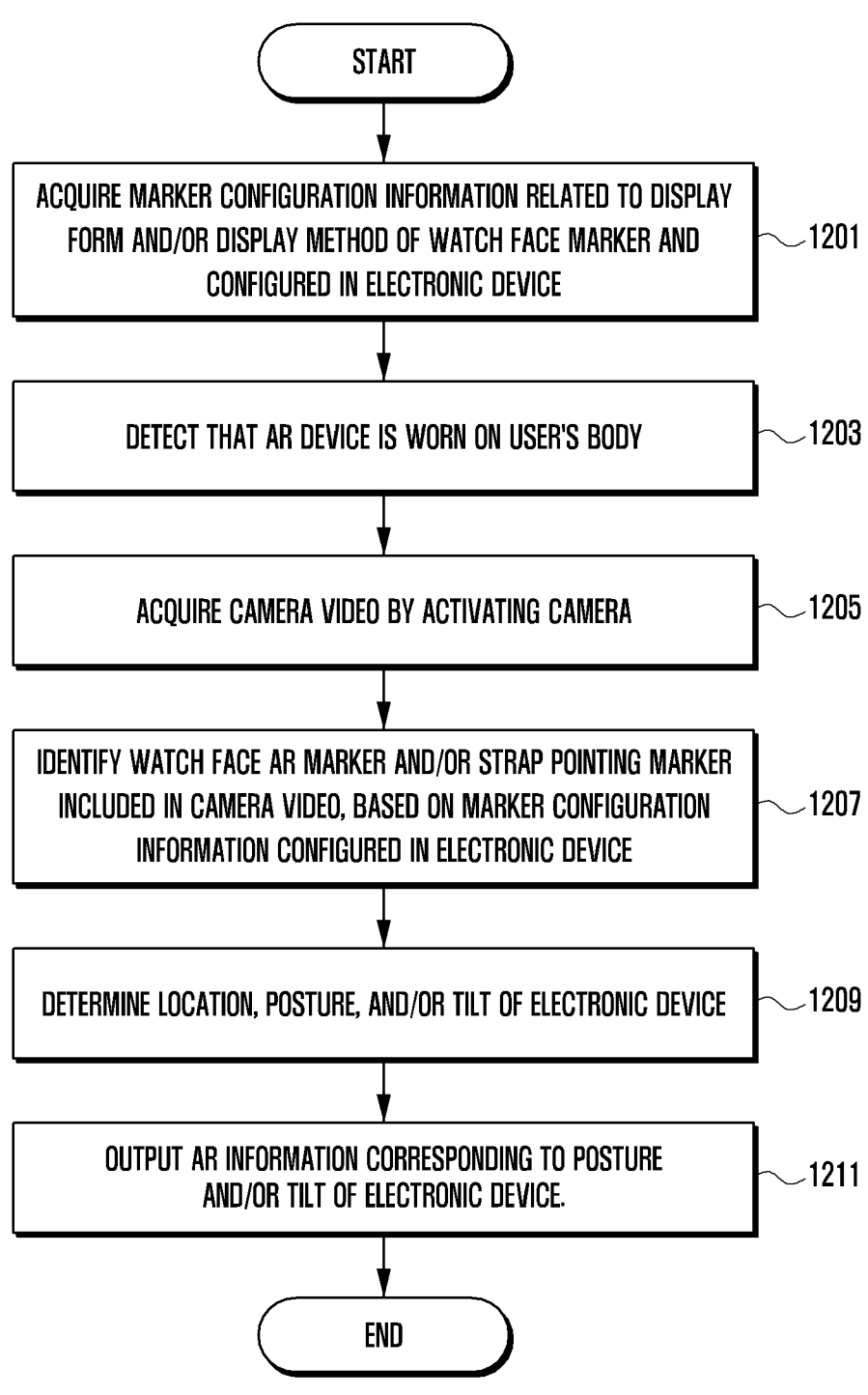

START

ACQUIRE MARKER CONFIGURATION INFORMATION RELATED TO DISPLAY FORM AND/OR DISPLAY METHOD OF WATCH FACE MARKER AND CONFIGURED IN ELECTRONIC DEVICE ~1201

DETECT THAT AR DEVICE IS WORN ON USER'S BODY ~1203

ACQUIRE CAMERA VIDEO BY ACTIVATING CAMERA ~1205

IDENTIFY WATCH FACE AR MARKER AND/OR STRAP POINTING MARKER INCLUDED IN CAMERA VIDEO, BASED ON MARKER CONFIGURATION INFORMATION CONFIGURED IN ELECTRONIC DEVICE ~1207

DETERMINE LOCATION, POSTURE, AND/OR TILT OF ELECTRONIC DEVICE ~1209

OUTPUT AR INFORMATION CORRESPONDING TO POSTURE AND/OR TILT OF ELECTRONIC DEVICE. ~1211

END

ELECTRONIC DEVICE AND METHOD FOR PROVIDING AR INFORMATION USING WATCH FACE IMAGE

CROSS-REFERENCE TO RELATED APPLICATIONS

This application is a continuation of International Application No. PCT/KR2023/013744 designating the United States, filed on Sep. 13, 2023, in the Korean Intellectual Property Receiving Office and claiming priority to Korean Patent Application Nos. 10-2022-0129913, filed on Oct. 11, 2022, and 10-2022-0155363, filed on Nov. 18, 2022, in the Korean Intellectual Property Office, the disclosures of each of which are incorporated by reference herein in their entireties.

BACKGROUND

Field

The disclosure relates to an electronic device and a method for providing AR information using an image.

Description of Related Art

Recently, there has been a proliferation of electronic devices (hereinafter, "AR devices") supporting augmented reality (AR) or mixed reality (MR) services that provide information by superimposing virtual images on images or backgrounds of real-world elements.

The above information may be provided as related art for the purpose of facilitating the understanding of the disclosure. No claim or determination is made as to the applicability of any of the foregoing as prior art related to the disclosure.

An augmented reality (AR) service may use a specific pattern of marker to synthesize or map virtual objects or virtual information on a real environment or a real-world image. An AR device may identify a marker in a camera video to synthesize and provide AR information (e.g., a virtual object or an additional object), based on a place where the marker is located. The AR device may detect a marker in a camera video to output AR information based on a place where the marker is located.

Markers that can be recognized by the AR device are printed separately and attached to a location for outputting AR information. However, the marker recognition rate of the separately printed markers may change depending on a surrounding environment, timing, or an angle. For example, when the surrounding environment is dark, patterns similar to markers exist, or markers are damaged, marker detection may be difficult. Therefore, when a marker is difficult to detect or when the recognition rate of the marker continues to drop, there may be inconvenience of having to print a new marker again to replace the existing marker.

SUMMARY

An augmented reality (AR) device according to an example embodiment may include: a communication module comprising communication circuitry, a camera, a display, a wear detection sensor, a memory, and a processor. The memory according to an embodiment may include instructions which, when executed by the processor cause the AR device to: receive, through the communication module, marker configuration information related to a display form and a display method of a watch face AR marker and configured in an electronic device. The memory according to an embodiment may include instructions which, when executed by the processor, cause the AR device to: detect, through the wear detection sensor, that the AR device is worn on a user's body and activate the camera. The memory according to an embodiment may include instructions which, when executed by the processor, cause the AR device to identify a watch face AR marker and a strap pointing marker included in a camera video, based on the marker configuration information configured in the electronic device. The memory according to an embodiment may include instructions which, when executed by the processor, cause the AR device to determine at least one of a location, a posture, and a tilt of the electronic device, based on the identified watch face AR marker and the identified strap pointing marker. The memory according to an embodiment may include instructions which, when executed by the processor, cause the AR device to output AR information corresponding to the posture or tilt, based on the location of the electronic device.

A method in which an AR device provides AR information using a watch face image, according to an example embodiment, may include receiving marker configuration information related to a display form and a display method of a watch face AR marker and configured in an electronic device (e.g., a wrist-worn electronic device) from the electronic device. The method according to an embodiment may include detecting that the AR device is worn on a user's body and activating a camera. The method according to an embodiment may include identifying a watch face AR marker and a strap pointing marker included in a camera video, based on the marker configuration information configured in the electronic device. The method according to an embodiment may include determining at least one of a location, a posture, and a tilt of the electronic device, based on the identified watch face AR marker and the identified strap pointing marker. The method according to an embodiment may include outputting AR information corresponding to the posture or the tilt, based on the location of the electronic device.

The electronic device and the method according to various example embodiments may increase usability of the electronic device by displaying AR information adaptively according to the movement or rotation of the electronic device (e.g., a wrist-worn electronic device) using a watch face image on the electronic device (e.g., the wrist-worn electronic device) without a separately printed marker.

The electronic device and the method according to various example embodiments may provide an augmented reality service in collaboration with an AR device using a watch face image in a way in which is invisible to a user.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a signal flow diagram illustrating an example method of providing AR information using a watch face image in an electronic device and an AR device according to various embodiments;

FIG. 8 is a diagram illustrating example screens describing an example display method of a watch face AR marker image in an electronic device according various embodiments;

FIG. 12 is a flowchart illustrating an example method for providing AR information using a watch face marker in the AR device 201 according to various embodiments.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
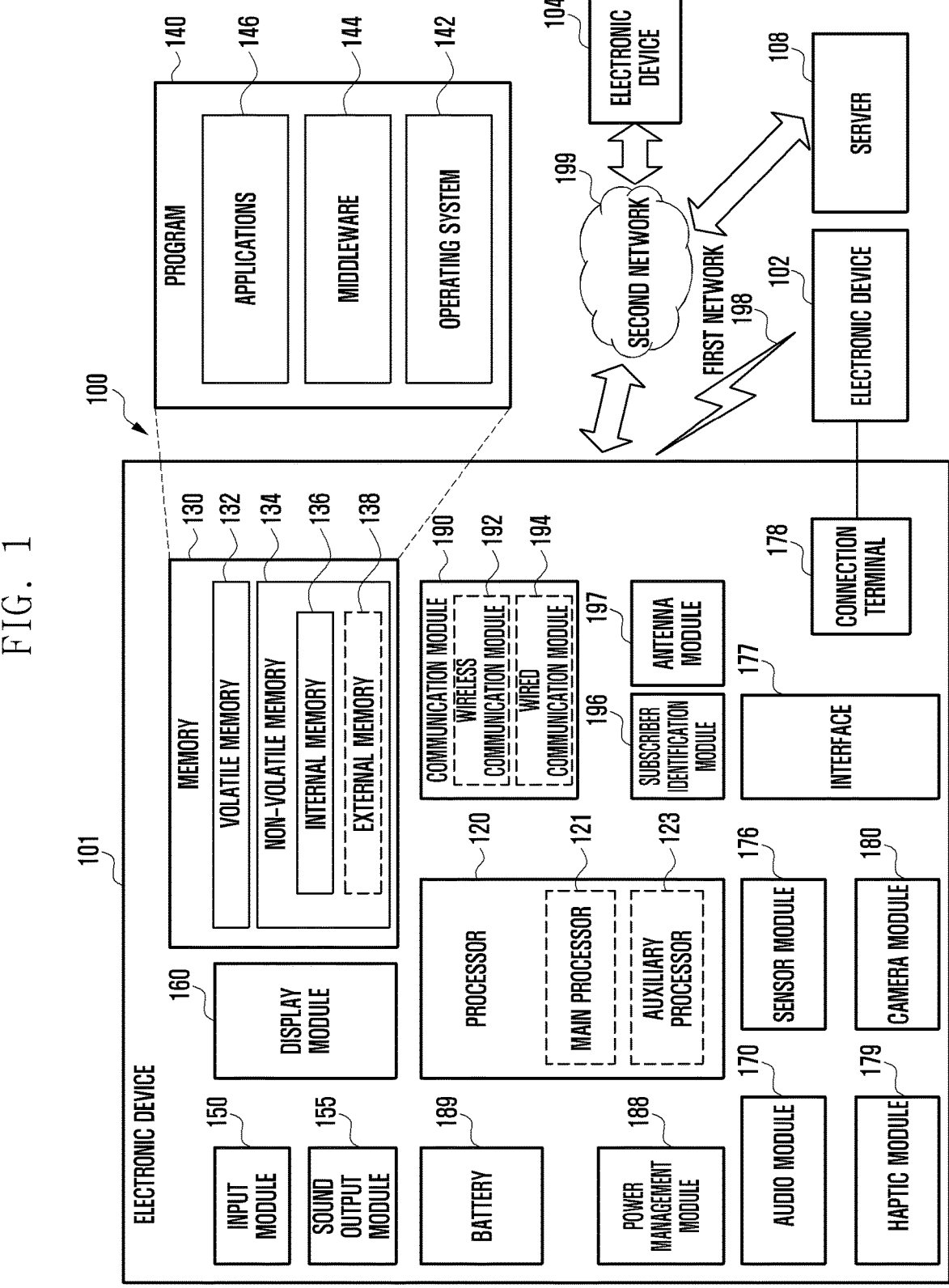
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, and/or flashes.

The power management module 188 may manage power supplied to and/or used by the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or a combination thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a millimeter (mm) Wave antenna module. According to an embodiment, the mmWave antenna module may include a printed circuit board, a radio frequency integrated circuit (RFIC) disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
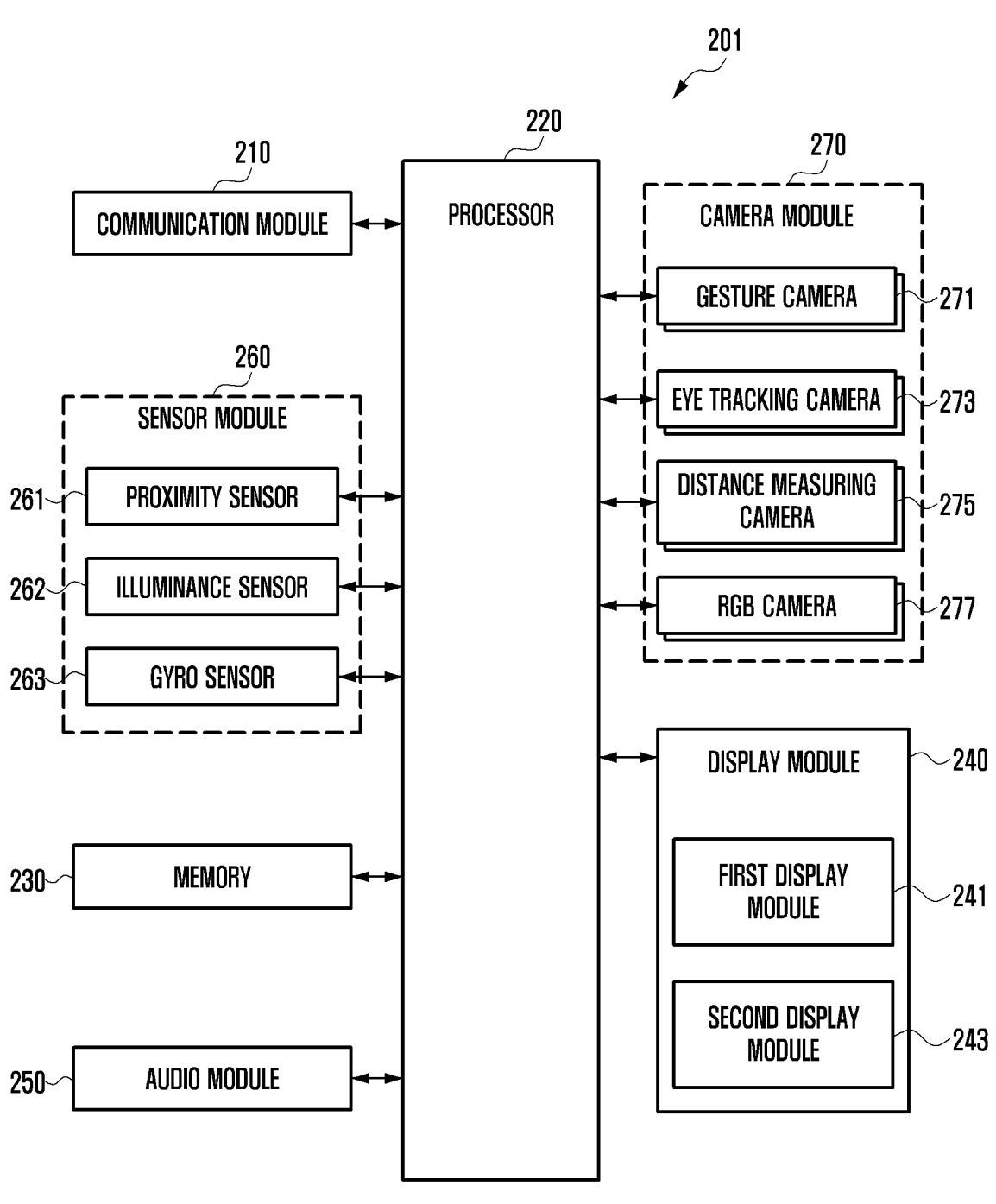
FIG. 2 is a block diagram illustrating an example configuration of an AR device according to various embodiments.

FIG. 2 is a block diagram illustrating an example configuration of an AR device according to various embodiments.

Referring to FIG. 2, according to an embodiments, an augmented reality (AR) device 201 that provides a user with an image related to an AR service may be configured in the form of at least one of glasses, goggles, a helmet, or a hat, but is not limited thereto. In an example, the AR device 201 may be a head-mounted device (HMD), a head-mounted display (HMD), or AR glasses.

In an embodiment, the AR device 201 may provide an AR service in conjunction with an electronic device 101 (or a host device or a controller device) (e.g., the electronic device 101 of FIG. 1).

In an embodiment, the AR device 201 may provide an AR service that outputs at least one virtual object so that the at least one virtual object appears overlapping with an area determined by a user's field of view (FoV). The area determined, for example, by the user's field of view is an area determined to be perceptible by the user through the AR device 201, and may include all or at least a portion of a display module 240 of the AR device 201.

In an embodiment, the AR device 201 may be at least partially controlled by the electronic device 101 (e.g., the electronic device 101 of FIG. 1), and at least one function may be performed under the control of the electronic device 101 (e.g., the electronic device 101 of FIG. 1).the AR device 201 may be at least partially controlled by the electronic device 101 (e.g., the electronic device 101 of FIG. 1), and at least one function may be performed under the control of the electronic device 101 (e.g., the electronic device 101 of FIG. 1).

In an embodiment, the AR device 201 may include a communication module (e.g., including communication circuitry) 210, a processor (e.g., including processing circuitry) 220, a memory 230, a display module (e.g., including a display 240, an audio module (e.g., including audio circuitry) 250, a sensor module (e.g., including at least one sensor) 260, and a camera module (e.g., including at least one camera) 270. Although not shown in the drawing, the AR device 201 may further include a power management module and a battery.

In an embodiment, the communication module 210 (e.g., a wireless communication circuit) may include various communication circuitry and perform communication with the electronic device 101 (e.g., the electronic device 101 of FIG. 1) through a wireless communication network (e.g., a first network 198 of FIG. 1 {e.g., short-distance wireless communication network}) or perform communication with a server device through a long-distance wireless network (e.g., a second network 199 of FIG. 1). In an example, the AR device 201 or 101 may perform wireless communication with the electronic device 101 (e.g., the electronic device 101 of FIG. 1) to exchange commands and/or data with each other.

In an embodiment, the communication module 210 may support a 5G network after a 4G network and a next-generation communication technology, for example, new radio (NR) access technology. The NR access technology may support high-speed transmission of high-capacity data (enhanced mobile broadband {eMBB}), terminal power minimization and connection of multiple terminals (massive machine type communications {mMTC}), or ultra-reliable and low-latency communications (URLLC). The communication module 210 may, for example, support a high frequency band (e.g., mmWave band) to achieve a high data rate. The communication module 210 may support various technologies for securing performance in a high frequency band, for example, beamforming, massive multiple-input and multiple-output (MIMO), full-dimensional MIMO, array antenna, analog beam-forming, or large scale antenna.

In an embodiment, the display module 240 may display at least one virtual object on at least a portion of the display panel so that the virtual object is added to an image related to a real space acquired through the camera module 270 by a user wearing the AR device 201.

According to various embodiments, the display module 240 may include a first display module 241 corresponding to the left eye of both eyes of the user and/or a second display module 243 corresponding to the right eye of the user.

In an embodiment, the display module 240 may include a transparent or translucent display.

In an embodiment, the display module 240 may include a lens. The lens may include a lens having a transparent waveguide. The lens may transmit light output from the display panel to the user's eyes. In an example, light emitted from the display panel may pass through the lens and be transmitted to a user through a waveguide formed in the lens. The waveguide may include at least one of at least one diffractive element (e.g., a diffractive optical element {DOE} or a holographic optical element {HOE}) or a reflective element (e.g., a reflective mirror). In another example, the waveguide may guide display light emitted from a light source unit to the user's eyes using at least one diffractive element or reflective element. The user may perceive a real space (or real environment) on the rear surface of the display through the display module 240.

In an embodiment, the audio module 250 may include various audio circuitry and convert a sound into an electrical signal or convert an electrical signal into a sound based on the control of the processor 220. For example, the audio module 250 may include a speaker and/or a microphone.

In an embodiment, the sensor module 260 may include at least one sensor and detect the movement of the AR device 201. The sensor module 260 may detect a physical quantity related to the movement of the AR device 201, for example, velocity, acceleration, angular velocity, angular acceleration, or geographic location of the AR device 201.

In an embodiment, the sensor module 260 may include various sensors. In an example, the sensor module 260 may include a proximity sensor 261, an illuminance sensor 262, and/or a gyro sensor 263, but is not limited thereto. The proximity sensor 261 may detect an object adjacent to the AR device 201. The illuminance sensor 262 may measure the level of brightness around the AR device 201. In an embodiment, the processor 220 may identify the level of brightness around the AR device 201 using the illuminance sensor 262 and change setting information related to the brightness of the display module 240 based on the level of brightness. The gyro sensor 263 may, for example, detect the state (or attitude or direction) and location of the AR device 201. The gyro sensor 263 may detect the movement of the AR device 201 or a user wearing the AR device 201.

In an embodiment, the camera module 270 may include at least one camera and capture still images and moving images. According to an embodiment, the camera module 270 may include one or more lenses, image sensors, image signal processors, or flashes.

The camera module 270 may include at least one of a gesture camera 271, a gaze tracking camera 273, a distance measurement camera 275 (a depth camera), and/or a red, green and blue (RGB) camera 277. According to an embodiment, the gesture camera 271 may detect a user's movement. For example, at least one gesture camera 271 may be disposed in the AR device 201 and may detect a user's hand movement within a predetermined distance. The gesture camera 271 may include a simultaneous localization and mapping (SLAM) camera for recognizing information (e.g., location and/or direction) related to the surrounding space of the AR device 201. The gaze tracking camera 273 may track the movement of the user's left and right eyes. According to an embodiment, the processor 220 may confirm the gaze direction of the left eye and the gaze direction of the right eye using the gaze tracking camera 273. The distance measurement camera 275 may measure a distance to an object located in front of the AR device 201. According to an embodiment, the distance measurement camera 275 may include a time of flight (TOF) camera and/or a depth camera. The distance measurement camera 275 may photograph the front direction of the AR device 201, and the gaze tracking camera 273 may photograph a direction opposite the photographing direction of the distance measurement camera 275. The red green blue (RGB) camera 277 may detect color related information of an object and distance information to the object.

In an embodiment, the gesture camera 271, the gaze tracking camera 273, the distance measurement camera 275, and/or the RGB camera 277 included in the camera module 270 may be included in the AR device 201, respectively, or some of them may be implemented as an integrated camera. The distance measurement camera 275 and the RGB camera 277 may, for example, be implemented as one integrated camera.

In an embodiment, the processor 220 may include various processing circuitry and may, for example, execute a program (e.g., the program 140 of FIG. 1) stored in the memory 230 to control at least one other component (e.g., the communication module 210, the display module 240, the audio module 250, the sensor module 260, or the camera module 270) related to the function of the AR device 201, and may perform data processing and operation required for tasks (e.g., AR tasks) related to an AR service. In another example, the processor 220 may include a computation processing unit.

In an embodiment, the processor 220 may acquire image information by capturing an image related to a real space corresponding to the field of view of the user wearing the AR device 201 through the camera module 270. The processor 220 may recognize information corresponding to an area determined by the user's field of view (FoV) among images related to the real space acquired through the camera module 270 of the AR device 201. The processor 220 may generate a virtual object based on virtual information based on the image information. In an embodiment, the processor 220 may display a virtual object related to the AR service together with the image information through the display module 240.

In an embodiment, the processor 220 may measure a physical quantity (e.g., geographic location, velocity, acceleration, angular velocity, and angular acceleration of the AR device 201) related to the movement of the AR device 201 through the sensor module 260, and the movement information of the AR device 201 may be obtained using the measurement physical quantity or a combination thereof.

In an embodiment, the processor 220 may analyze the movement information and image information of the AR device 201 in real time to control to perform AR tasks, for example, a head tracking task, a hand tracking task, and an eye tracking task.

Figure 3:
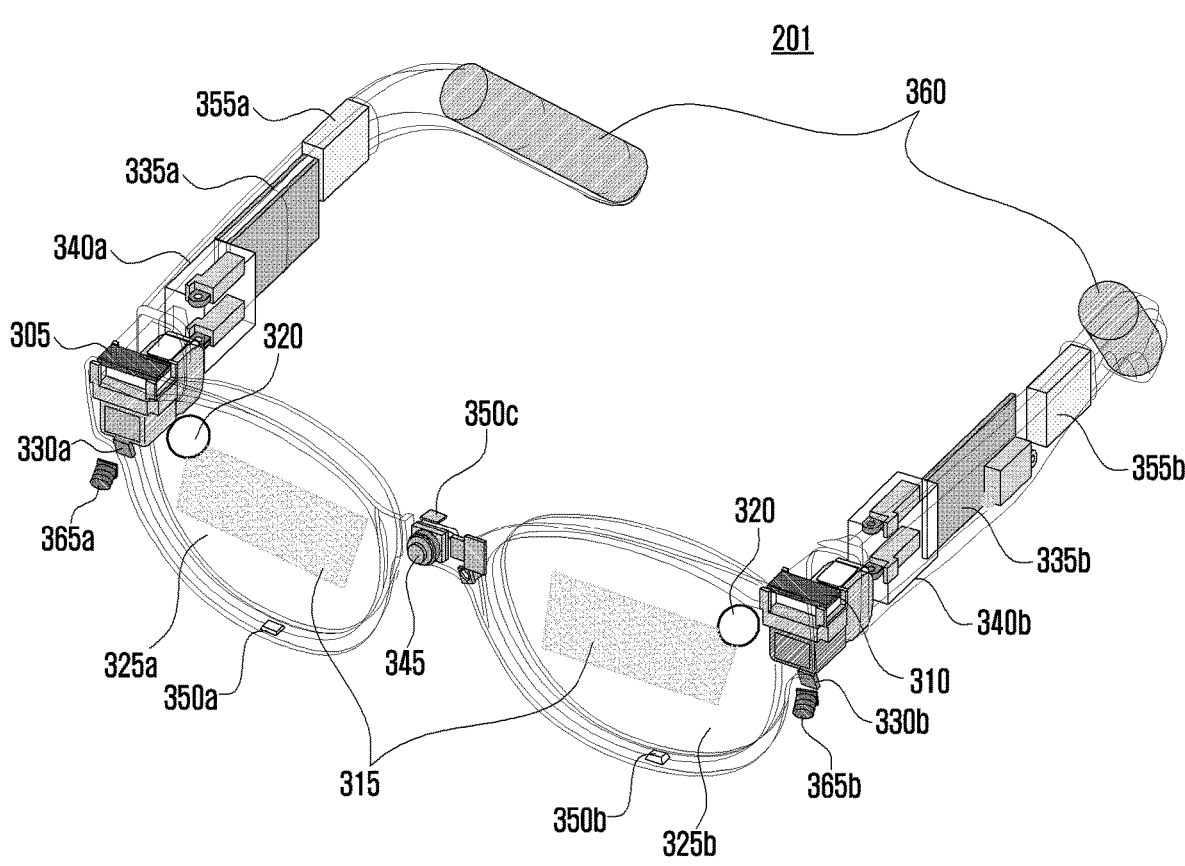
FIG. 3 is a diagram illustrating an example AR device according to various embodiments.

FIG. 3 is a diagram illustrating an example AR device according to various embodiments.

Referring to FIG. 3, According to various embodiments an augmented reality (AR) device(e.g., the AR device 201 of FIG. 2) may be worn on a user's head to provide an image related to an augmented reality (AR) service and/or an virtual reality(AR) service to the user. An AR device 201 may further include at least some of the elements and/or features of the AR device in FIG. 2, and may have substantially the same overlapping elements as in FIG. 2.

In an embodiments, the AR device 201 may include a first display 305 (e.g., the first display module 241 of FIG. 2) and/or a second display 310) (e.g., the second display module 243 of FIG. 2), a screen display unit 315, an input optical members 320, a first transparent member 325*a*, a second transparent member 325*b*, lighting units 330*a* and 330*b*, a first printed circuit board 335*a*, a second printed circuit board 335*b*, a first hinge 340*a*, a second hinge 340*b*, a first camera 345, multiple microphones (e.g., the first microphone 350*a*, the second microphone 350*b*, and the third microphone 350*c*, the plurality of speakers (e.g., the first speaker 355*a* and the second speaker 355*b*), a battery 360, a second camera 365*a* and a third camera 365*b*.

According to an embodiment, display (e.g., the first display module 305 and the second display module 310) may include, for example, a liquid crystal display (LCD), a digital micro-mirror device (DMD), a light emitting diode (LED). liquid crystal-on-silicon (LCoS), an organic light-emitting diode (OLED), or a micro light-emitting diode (micro LED). Although not shown, when the display is one of a liquid crystal display, a digital mirror display, or a silicon liquid crystal display device, the AR device 201 may include a light source for emitting light to a screen output area of the display. In an embodiment, when the display is capable of self-generating light, for example, when the display is made of either an organic light-emitting diode or a micro LED, the AR device 201 may provide a high-quality virtual video to a user without including a separate light source. In an embodiment, when the display is implemented as an organic light-emitting diode or a micro LED, a light source is unnecessary, and thus the AR device 201 may be lightweight.

The displays (e.g., first display 305 and second display 310) according to various embodiments may include at least one micro light-emitting diode (micro LED). For example, the micro LED can represent red (R), green (G), and blue (B) by self-emission, and can be small in size (e.g., 100 μm or less), so that a single chip can implement one pixel (e.g., one of R, G, and B). Accordingly, when the display includes micro LEDs, the display can provide high resolution without a backlight unit (BLU).

The disclosure is not limited thereto, and one pixel may include R, G, and B, and one chip may be implemented with multiple pixels including R, G, and B.

In an embodiment, the display (e.g., first display 305 and second display 310) may include a display area including pixels for displaying a virtual video, and light-receiving pixels (e.g., photo sensor pixels) disposed between the pixels so as to receive light reflected from an eye, convert the light to electrical energy, and output the light.

In an embodiment, the AR device 201 (e.g., the processor 220 in FIG. 2) may detect a user's gaze direction (e.g., pupil movement) through the light-receiving pixels. For example, the AR device 201 may detect and track the gaze direction of the user's left eye and the gaze direction of the user's right eye through one or more light-receiving pixels of the first display 305 and one or more light-receiving pixels of the second display 310. The AR device 201 may determine the location of the center of a virtual video based on the gaze directions of the user's right and left eyes (e.g., the direction in which the pupils of the user's right eye and the pupils of the user's right and left eyes are looking) detected through the one or more light-receiving pixels.

In an embodiment, light emitted from the displays (e.g., the first display 305 and the second display 310) may pass through a lens (not shown) and a waveguide to reach the screen display unit 315, which is formed in the first transparent member 325*a* disposed to face a use's right eye, and the screen display unit 315, which is formed in the second transparent member 325*b* disposed to face a user's left eye. For example, light emitted from the displays (e.g., the first display 305 and the second display 310) may pass through the waveguide, reflect off grating areas formed on the input optical members 320 and the screen display units 315, and reach the user's eyes. The first transparent member 325*a* and/or the second transparent member 325*b* may be formed of a glass plate, a plastic plate, or a polymer, and may be made transparent or translucent.

In an embodiment, the lens (not shown) may be disposed on each of the front surfaces of the displays (e.g., the first display module 305 and the second display module 310). The lens may include a concave lens and/or a convex lens. For example, the lens may include a projection lens or a collimation lens.

In an embodiment, screen display unit 315 or the transparent member (e.g., the first transparent member 325*a* and/or the second transparent member 325*b*) may include a lens having a transparent waveguide and reflective lens.

In an embodiment, the waveguide may be made of glass, plastic, or polymer, and may include nanopatterns formed on one surface inside or outside the same. The nanopattern may include a polygonal or curved grating structure. According to an embodiment, the light incident on one surface of the transparent member (e.g., the first transparent member 325*a* and/or the second transparent member 325*b*) may be transmitted or reflected by the nano-pattern inside the waveguides to be transmitted to the user. According to an embodiment, the waveguides may include at least one of at least one diffractive element (e.g., a diffractive optical element (DOE) or a holographic optical element (HOE)) or a reflective element (e.g., a reflective mirror). According to an embodiment, the waveguides may guide the light emitted from the display (e.g., the first display module 305 and the second display module 310) (e.g., light sources) to the user's eyes using at least one diffractive element or reflective element.

In an embodiment, the diffractive element may include an input optical member 320/output optical member (not shown). The input optical member 320 may indicate an input grating area, and the output optical member (not shown) may indicate an output grating area. The input grating area may serve as an input terminal that diffracts (or reflects) the light output from the display (e.g., the first display module 305 and the second display module 310) (e.g., micro LEDs) to transmit the same to the transparent member (e.g., the first transparent member 325a and/or the second transparent member 325b) of the screen display unit 315. The output grating area may serve as an outlet that diffracts (or reflects) the light transmitted to the transparent member (e.g., the first transparent member 325a and/or the second transparent member 325b) of the waveguides to the user's eyes.

In an embodiment, the reflective element may include a total reflection optical element or a total reflection waveguide for total internal reflection (TIR). Total internal reflection is one way of guiding light in which an incident angle is formed such that light (e.g., a virtual image) input through the input grating area is reflected about 100% by one surface (e.g., a specified surface) of the waveguides 420 and 430, thereby transmitting about 100% of light to the output grating area.

In an embodiment, an optical path of light emitted from the displays 305 and 310 may be optically guided into the waveguide through the input optical members 320. Light traveling in the waveguide may be guided toward the user's eyes through the output optical member. The screen display units 315 may be determined based on the light emitted toward the eyes.

According to an embodiment, the first camera 345 may include a high-resolution camera such as a high-resolution (HR) camera and/or a photo video (PV) camera. For example, the first camera 345 may utilize an autofocus function and an optical image stabilizer (OIS) function to obtain high-quality images. The photographing camera 380 may be implemented as a global shutter (GS) camera and a rolling shutter (RS) camera in addition to a color camera.

According to an embodiment, the second camera 365a and the third camera 365b may be used for 3DoF or 6 DoF head tracking, hand detection, and/or hand tracking, a gesture recognition and/or recognizing a space recognition. For example, the second camera 365a and the third camera 365b may be utilized to perform spatial recognition for 6 DoF and a simultaneous localization and mapping (SLAM) function through depth imaging. The second camera 365a and the third camera 365b may include GS camera, to detect and track hand movement and/or head movement.

In an embodiment, at least one sensor (e.g., the sensor module 260 in FIG. 2) (e.g., a gyro sensor, an acceleration sensor, a geomagnetic sensor, and/or a gesture sensor), the second camera 365a, and the third camera 365b may perform at least one of head tracking for 6 DoF, pose estimation and prediction, gesture and/or space recognition, and a slam function through depth imaging In an embodiment, the second camera 365a and third camera 365b may be used separately as a camera for head tracking and a camera for hand tracking.

In an embodiment, lighting units 330a and 330b may serve different purposes depending on where the lighting units are attached. For example, the lighting units 330a and 330b may be attached with the second camera 365a and the third camera 365b disposed around hinges (e.g., the first hinge 340a and the second hinge 340b) connecting frames to temples, or around a bridge connecting the frames to each other. When shooting with a GS camera, each of the lighting units 330a and 330b may be used as a means of supplementing ambient brightness. For example, the lighting units 330a and 330b may be used when it is difficult to detect a subject to be photographed due to a dark environment or due to mixed and reflected light from multiple light sources.

According to an embodiment, the printed circuit board (e.g., a first printed circuit board 335a and a second printed circuit board 335b) may be disposed respective elements (e.g., the processor 220, and/or the memory 230, etc.)) of the AR device 201. The PCB may transmit electrical signals to respective elements of the AR device 201.

In an embodiment, the multiple microphones (e.g., the first microphone 350a, the second microphone 350b, and the third microphone 350c) may process external acoustic signals into electrical speech data. The processed speech data may be used in a variety of ways depending on a function being performed (or application being executed) in the AR device 201.

In an embodiment, the plurality of speakers (e.g., the first speaker 355a and the second speaker 355b) may output audio data received from a communication module (e.g., the communication module 210 in FIG. 2) or stored in a memory (e.g., the memory 230 in FIG. 2).

In an embodiment, the battery 360 may include one or more batteries and may provide power to the elements of the AR device 201.

Figure 4:
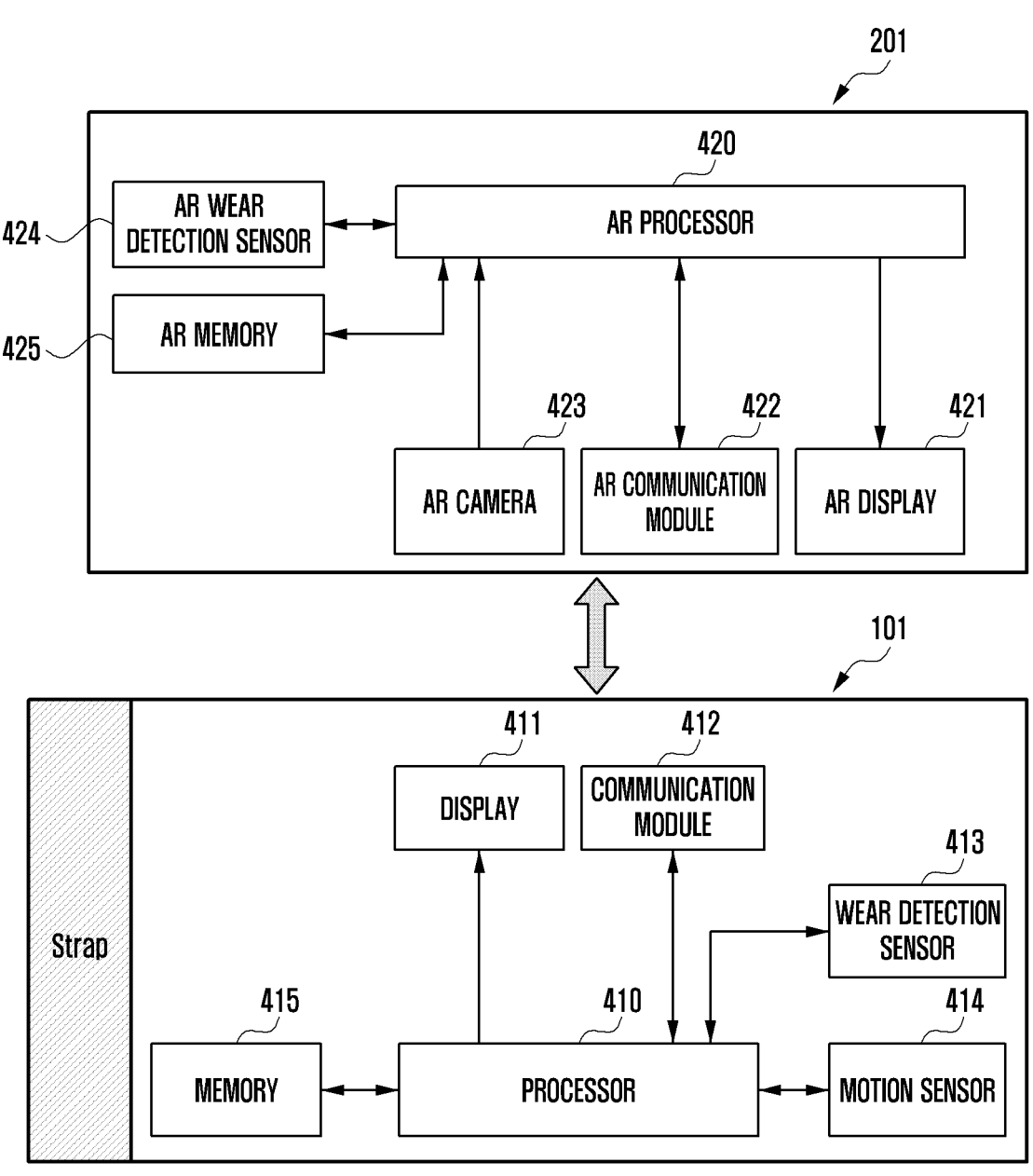
FIG. 4 is a block diagram illustrating an example configuration of an electronic device and an AR device according to various embodiments.
Figure 5:
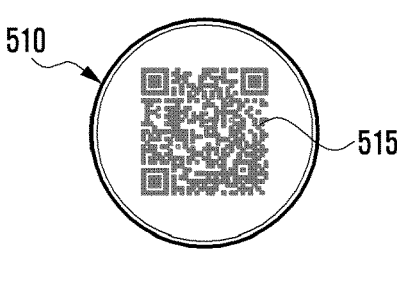
FIG. 5 is a diagram illustrating examples of watch face AR marker images displayed on an electronic device according to various embodiments.
Figure 5:
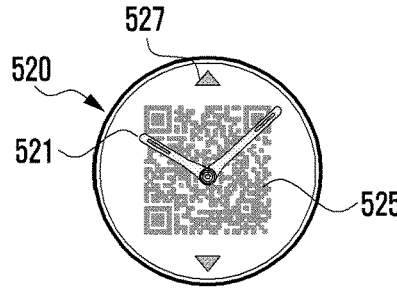
Figure 5:
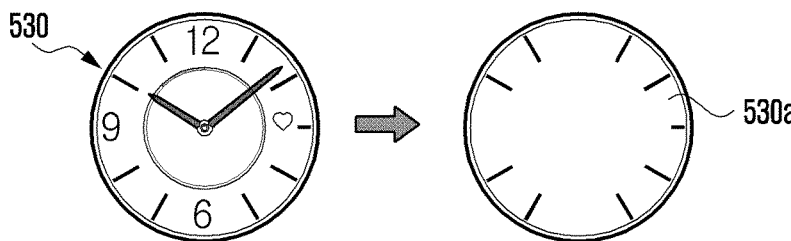
Figure 5:
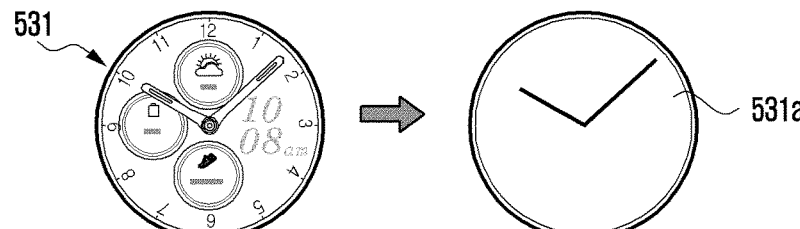
Figure 5:
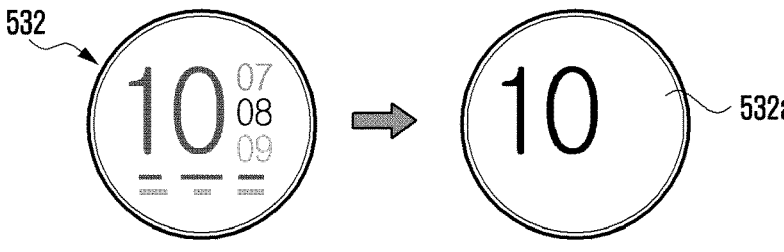

FIG. 4 is a block diagram illustrating an example configuration of an electronic device 101 and an AR device 201 according to various embodiments, and FIG. 5 is a diagram illustrating examples of watch face AR marker images displayed on an electronic device according to various embodiments.

Referring to FIG. 4, according to an embodiment, an electronic device (e.g., the electronic device 101 in FIG. 1) and an augmented reality (AR) device (e.g., the AR device 201 in FIG. 2) may provide an augmented reality service in conjunction with each other.

According to an embodiment, the electronic device 101 may generate and display an AR marker (e.g., a watch face AR maker) through a display. The AR device 201 may detect an AR marker while recording a camera video and may provide AR information (e.g., a virtual object) to the location of the AR marker.

For example, the electronic device 101 may be a wrist-worn electronic device (or a watch-type electronic device or a smart watch), and the AR device 201 may be a glasses-type electronic device or a head mount display (HMD) device. However, the disclosure is not limited thereto. According to various embodiments, when the electronic device 101 is a wrist-worn electronic device, the electronic device 101 and the AR device 201 may be connected to other electronic devices (e.g., smartphones, mobile devices, or server devices) through account linkage, and the operation of the electronic device 101 may be controlled based on control configuration (or remote configuration) of the other electronic devices.

According to an embodiment, the electronic device 101 may include a display 411 (e.g., the display module 160 in FIG. 1), a communication module (e.g., including communication circuitry) 412 (e.g., the communication module 190 in FIG. 1), a wear detection sensor 413 (e.g., the sensor module 176 in FIG. 1), a motion sensor 414 (e.g., the sensor module 176 in FIG. 1), a memory 415 (e.g., the memory 130 in FIG. 1), and a processor (e.g., including processing circuitry) 410 (e.g., the processor 120 in FIG. 1). For example, the electronic device 101 shown in FIG. 4 may have the same or similar configuration as the electronic device 101 shown in FIG. 1 or may further include the configuration of the electronic device 101 shown in FIG. 1. A detailed description of the same elements as those in FIG.

1 may not be repeated, and operations related to an augmented reality service will be described.

According to an embodiment, the display 411 may display a watch face image or a watch AR marker image.

According to an embodiment, the communication module 412 may include various communication circuitry and communicate with the AR device 201 through wireless communication (e.g., at least one of WiFi-P2P, Bluetooth, and Bluetooth low energy (BLE) communication). The communication module 412 may transmit watch face image information or/and watch face marker configuration information to the AR device 201 through account linkage with the AR device 201.

According to an embodiment, the communication module 412 may provide (or share) operation information (e.g., sensing information) of the electronic device 101 to the AR device 201 when providing an augmented reality service in conjunction with the AR device.

According to an embodiment, the wear detection sensor 413 may detect that the electronic device 101 is worn on a user's body, and may transmit sensing information to the processor 410. For example, when it is recognized that the electronic device 101 is worn on the user's body and that the AR device 201 is also worn on the user's body, the processor 410 may control an AR marker image to be displayed on a watch face image, and when the electronic device 101 or the AR device 201 is detached (or not worn), the processor 410 may control the AR marker image not to be displayed.

According to an embodiment, the motion sensor 414 may detect motion of the electronic device 101 and transmit sensing information to the processor 410. For example, the processor 410 may determine the movement or direction of the electronic device 101 or the tilt/posture of the electronic device 101, based on the sensing information transmitted from the motion sensor 414.

According to an embodiment, the memory 415 may store instructions which cause the processor 410 to control the electronic device 101. The instructions may be stored as software on the memory 415 and may be executed by the processor 410.

According to an embodiment, the memory 415 may store watch face marker configuration information.

According to an embodiment, the processor 410 may include various processing circuitry and control the electronic device 101 or may process (or perform) operations of elements of the electronic device 101. The processor 410 may generate a watch face AR marker image to be displayed on a watch face image and may control display of the AR marker image. The processor may control the display of the AR marker image according to an AR marker display configuration method.

According to an embodiment, in a first display configuration method, the processor 410 may separately display a watch face AR marker image only in 1 to n (e.g., n<5) frames while displaying a watch face image (=a representative image) at the frame scan rate (frame rate) of the display. When the display 411 outputs the watch face image at a scan rate of 60 to 120 Hz (scan rate: the number of frames displayed per second), the processor 410 may perform control to display a watch face AR marker image in only 1 to n frames of the scan rate so that the AR device 201 can identify an AR marker. For example, since a watch face AR marker image is displayed only in 1 to n frames per second, the user cannot visually identify the AR marker image and can view only a watch face image configured as a representative on the display of the AR device.

For example, as shown in <501> in FIG. 5, the processor 410 may generate a watch face AR marker image 510, separately from a watch face image configured as a representative. The watch face AR marker image 510 may be configured to be displayable on the display 411 of the wrist-worn electronic device (e.g., the electronic device 101), and may include a figure (e.g., a QR code) having a specific pattern (or a unique pattern) 515 including marker identification information (e.g., device information of the wrist-worn electronic device). However, the disclosure is not limited thereto. For example, when driving a display displaying a 60 hz screen, the processor 410 may control the display to display a watch face image configured as a representative in frames 1 to 59 for frame units and to display a watch face AR marker image in frame 60.

According to an embodiment, in a second display configuration method, the processor 410 may synthesize and generate an AR marker pattern 525 and a pointing marker 527, which can be recognized by the AR device 201, with a watch face image 520 (e.g., including the hour hand and second hand 521) itself, and may display the watch face image 520, with which the AR marker pattern 525 is synthesized, as a representative watch face image. For example, as shown in <502> in FIG. 5, the processor 410 may generate the watch face image 520 including a figure (e.g., a QR code) having a specific pattern (or unique pattern) 525 and may configure, as a representative watch face image, the watch face image 520 including the figure (e.g., the QR code) having the specific pattern (or unique pattern) 525.

According to an embodiment, in a third display configuration method, as shown in <503> in FIG. 5, the processor 410 may be configured so that the electronic device 101 may synchronize screen configuration information (e.g., a frame, the shape of second hand and minute hand, and color/background image/thumbnail image) of a watch face image (e.g., 530, 531, or 532) configured as a representative image with the AR device in advance, and that in an augmented reality service, the AR device 201 recognizes the watch face image of the electronic device 101 more quickly The watch face image of the electronic device 101 is intended to provide time information, and thus may have a simple normalized pattern in relation to the time display. For example, as shown in <503> in FIG. 5, when the representative face image configured in the electronic device 101 is a first image 530, a normalized image 530a of the first image 530 may be designated as an AR marker identification pattern. In another example, when the representative face image currently configured in the electronic device is a second image 531, a normalized image 531a of the second image 531 may be designated as an AR marker identification pattern, or when the representative face image is a third image 532, a normalized image 532a of the third image 532 may be designated as an AR marker identification pattern. The AR device 201 stores screen configuration information of a watch face image configured as a representative image configured in the electronic device 101, and thus may more quickly identify an AR marker identification pattern from the watch face image when tracking the electronic device in a camera video.

According to an embodiment, the electronic device 101 may adjust the number of times the watch face AR marker image is displayed, depending on the marker recognition situation of the AR device 201.

When a wear detection of the AR device 201 transmitted through wireless communication is received, the processor 410 may adjust the number of times the watch face AR marker image is displayed. For example, when the electronic device 101 is configured to display a watch face AR marker image 1 or 2 times within 60 frames, the frequency of display may be adjusted to 3 to 5 times in order to improve a recognition rate in the AR device. When the AR device 201 is in an initial state of not detecting an AR marker, faster recognition may be achieved by increasing the number of times the watch face AR marker image is displayed. When AR marker initial recognition information is received from the AR device 201, the electronic device 101 may return, to an original value, the number of times the watch face AR marker image is displayed.

According to an embodiment, when the electronic device 101 is a wrist-worn electronic device, the electronic device 101 may include a strap structure for attaching and detaching the electronic device 101 to and from a user's wrist. The strap structure of the electronic device 101 may include, in at least a part thereof, a pattern decoration in a shape or form that the AR device 201 can identify as a strap pointing marker.

According to an embodiment, an AR device (e.g., the AR device 201 in FIG. 2) may include an AR display 421 (e.g., the display module 240 in FIG. 2), an AR communication module (e.g., including communication circuitry) 422 (e.g., the communication module 210 in FIG. 2), an AR camera module (e.g., including at least one camera) 423 (e.g., the camera module 270 in FIG. 2), an AR wear detection sensor 424 (e.g., the sensor module 260 in FIG. 2), an AR memory 425 (e.g., the memory 230 in FIG. 2), and an AR processor (e.g., including processing circuitry) 420 (e.g., the processor 220 in FIG. 2). For example, the AR device 201 shown in FIG. 4 may have the same or similar configuration as the AR device 201 shown in FIGS. 2 and 3 or may further include the configuration of the AR device 201 shown in FIGS. 2 and 3. A detailed description of the same elements as those in FIGS. 2 and 3 may not be repeated, and operations related to an augmented reality service will be described.

According to an embodiment, the AR display 421 may perform a function of providing AR information (e.g., a virtual object) while superimposing the AR information on an external real image/video. For example, the AR display 421 may be implemented in the form of optical see-through (OST) or video see-through (VST), and may display, at least a part thereof, at least one piece of AR information so that the AR information appears to be superimposed on a real video acquired through the AR camera module 423.

According to an embodiment, the AR communication module 422 may include various communication circuitry and be connected to the electronic device 101 through wireless communication (e.g., at least one of WiFi-P2P, Bluetooth, and Bluetooth low energy (BLE) communication). The AR communication module 422 may transmit (or share) various types of data for supporting an augmented reality service to the electronic device 101 in real time.

According to an embodiment, the AR communication module 422 may receive information about a watch face image configured as a representative image in the electronic device 101 or/and watch face marker configuration information (e.g., communication forwarding or synchronization based on account linking).

According to an embodiment, the AR communication module 422 may receive motion sensing information of the electronic device 101 from the electronic device 101.

According to an embodiment, the AR camera module 423 may perform a function of capturing external reality images/videos. For example, the AR camera module 423 may capture a video including the electronic device 101 and transmit the captured video data to the AR processor 420.

According to an embodiment, the AR camera module 423 may be configured to operate at a scan rate that is equal to or higher than the display driving scan rate of the electronic device 101. The AR camera module 423 may capture images at several tens of frames per second to distinguish an AR marker displayed in a specific frame of the display 411 screen of the electronic device.

According to an embodiment, the AR wear detection sensor 424 may detect that the AR device 201 is worn on the user's body, and may transmit sensing information to the AR processor 420. For example, the AR processor 420 may determine whether to activate the AR camera module 423, based on whether the AR device is worn. The AR processor 420 may transmit a signal (wear state information or detachment state information), which is based on whether the AR device is detected to be worn, to the electronic device 101 through the AR communication module 422.

According to an embodiment, the AR memory 425 may store instructions which cause the AR processor 420 to operate. The instructions may be stored as software in the AR memory 425 and may be executed by the AR processor 420. The AR memory 425 may store the information about a watch face image configuration as a representative image in the electronic device 101 and/or the watch face marker configuration information.

According to an embodiment, the AR processor 420 may include various processing circuitry and transmit (e.g., via the AR communication module 422)commands (or control information) to the electronic device 101 to control the AR device 201 or to process (or perform) operations of elements of the electronic device 101. The AR processor 420 may receive a captured video from the AR camera 423 and may perform a function for detecting an AR marker related to an augmented reality service from the video.

According to an embodiment, the AR processor 420 may analyze the camera video based on the marker configuration information transmitted from the electronic device 101 to track at least one of an AR marker and a strap pointing marker from the camera video. For example, the AR processor 420 may capture the camera video in frame units, and may identify an AR marker and/or a strap pointing marker from the watch face AR marker image or the watch face image by utilizing a tracking algorithm using a specific value (e.g., a color or a shape).

According to an embodiment, the AR processor 420 may recognize the electronic device 101 based on marker identification information included in the AR marker, and may identify a location (e.g., coordinate information) of the electronic device 101.

The AR processor 420 may identify the tilt and/or posture of the electronic device 101 through the strap pointing marker. For example, when two strap pointing markers are recognized in a camera video, the AR processor 420 may determine that the electronic device is in a posture in which the front surface of the electronic device faces the user's gaze, and when one strap pointing marker is recognized, the AR processor 420 may be determined that the electronic device is in a posture in which the side surface of the electronic device faces the user's gaze.

According to an embodiment, when motion sensor information of the electronic device 101 transmitted from the electronic device 101 is received, the AR processor 420 may supplement marker tracking with the result of analyzing the motion sensor information of the electronic device 101, so that when an AR marker (or the electronic device 101) is outside the camera video, the location and/or posture of the electronic device 101 may be estimated.

According to an embodiment, the AR processor 420 may perform control to configure the location (e.g., coordinate information) of the recognized electronic device 101 in the camera video as display coordinates of AR information and to output AR information corresponding to (or suitable for or optimized for) the posture and tilt of the recognized electronic device. The AR information may include AR objects (e.g., a message icon) for controlling a function of the electronic device 101, but the disclosure is not limited thereto.

For example, when the front surface of the electronic device 101 faces the user's gaze, the AR processor 420 may perform control to output AR information in full version mode (e.g., first type AR information) indicating detailed information associated with the electronic device 101. When the side surface of the electronic device 101 faces the user's gaze, the AR processor 420 may perform control to output, on the AR display 421 (e.g., AR glasses), AR information in simple version mode (e.g., second type AR information) indicating schematic information.

According to an embodiment, the AR processor 420 may track, through the AR camera module 423, whether a user's finger is located at the coordinates where AR information is displayed or whether a specific movement is detected, to determine whether the user controls the AR information with the finger. For example, when movement for selecting one of the AR objects is recognized, the AR processor 420 may transmit control information of the selected AR object to the electronic device 101. The electronic device 101 may perform control to execute a function of the selected AR object based on the control information transmitted from the AR device 201 or to display information related to the selected AR object on the display 411.

Figure 6:
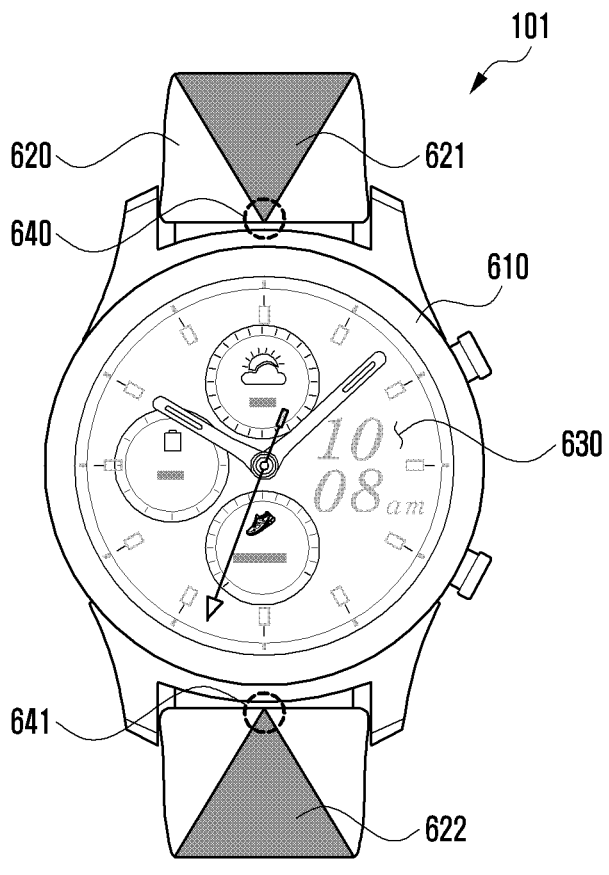
FIG. 6 is a diagram illustrating an example of a strap configuration of an electronic device according to various embodiments.

FIG. 6 is a diagram illustrating an example of a strap configuration of an electronic device according to various embodiments.

Referring to FIG. 6, according to an embodiment, an electronic device 101 (e.g., a wrist-worn electronic device) may include a housing 610 for mounting elements of the electronic device 101, strap structures 620 located at both ends of the housing 610 to attach and detach the electronic device 101 to and from a user's wrist, and a display 630 for displaying visual information. For example, the electronic device 101 in FIG. 6 may include at least some of the elements and/or functions of the electronic device 101 in FIG. 1.

According to an embodiment, the strap structure 620 may include pattern decorations 621 and 622, which the AR device 201 can identify as strap pointing markers in at least parts of both ends located adjacent to the housing 610. For example, the pattern decoration 621 is a strap design element, and may be designed at a first location 640 and a second location 641 for expressing the center line. For example, the pattern decorations 621 and 622 may include a first pattern decoration 621, which has a first direction and is located at one end connected to the housing 610, and a second pattern decoration 622, which has a second direction and is located at the other end of the housing 610, wherein the first direction and the second direction are designed to have a single axis. The shape and/or color of the pattern decorations 621 and 622 are designed in various ways, and are not limited to the example shown in FIG. 6.

An augmented reality (AR) device (e.g., the AR device 201 in FIG. 2) according to an example embodiment may include: a communication module comprising communication circuitry (e.g., communication module 210 in FIG. 2 or the AR communication module 422 in FIG. 4), a camera (e.g., the camera module 270 in FIG. 2 or the AR camera module 423 in FIG. 4), a display (e.g., the display module 240 in FIG. 2 or the AR display 421 in FIG. 4), a wear detection sensor (e.g., the sensor module 260 in FIG. 2 or the AR wear detection sensor 424 in FIG. 4), a memory (e.g., the memory 230 in FIG. 2 or the AR memory 425 in FIG. 4), and a processor (e.g., the processor 220 in FIG. 2 or the AR processor 420 in FIG. 4). The memory according to an example embodiment may include instructions which, when execute by the processor control the AR device to receive, through the communication module (e.g., the communication module 210 in FIG. 2 or the AR communication module 422 in FIG. 4), marker configuration information related to a display form and a display method of a watch face AR marker and configured in an electronic device (e.g., a wrist-worn electronic device) (e.g., the electronic device 101 in FIG. 4).

The memory according to an example embodiment may include instructions which, when executed by the processor control the AR device to detect, through the wear detection sensor (e.g., the AR wear detection sensor 424 in FIG. 4), that the AR device is worn on a user's body and activate the camera (e.g., the camera module 270 in FIG. 2 or the AR camera module 423 in FIG. 4).

The memory according to an example embodiment may include instructions which, when executed by the processor control the AR device to identify a watch face AR marker and a strap pointing marker included in a camera video, based on the marker configuration information configured in the wrist-worn electronic device.

The memory according to an example embodiment may include instructions which, when executed by the processor control the AR device to determine at least one of a location, a posture, and a tilt of the wrist-worn electronic device, based on the identified watch face AR marker and the identified strap pointing marker.

The memory according to an example embodiment may include instructions which, when executed by the processor control the AR device to output AR information corresponding to the posture or tilt, based on the location of the wrist-worn electronic device.

The processor according to an example embodiment may be configured to adjust, based on the marker configuration information, a driving frequency of the camera (e.g., the camera module 270 in FIG. 2 or the AR camera module 423 in FIG. 4) to have a performance equal to or higher than a scan rate of a display (e.g., the display 411 in FIG. 4) of the wrist-worn electronic device.

The processor according to an example embodiment may be configured to identify an AR marker from a watch face AR marker image or a watch face image and identify a strap pointing marker included in a strap of the wrist-worn electronic device.

The processor according to an example embodiment may be configured to receive the marker configuration information by performing account synchronization with the wrist-worn electronic device through the communication module (e.g., the communication module 210 in FIG. 2 or the AR communication module 422 in FIG. 4).

The processor according to an example embodiment may be configured to: recognize the electronic device by analyzing the camera video in frame units and identifying an AR marker displayed on the display (e.g., the display 411 in FIG. 4) of the wrist-worn electronic device and identify location information or coordinate information of the wrist-worn electronic device, and identify the posture of the wrist-worn electronic device, based on the number of identified strap pointing markers in the camera video.

The processor according to an example embodiment may be configured to determine whether the display (e.g., the display 411 in FIG. 4) of the recognized wrist-worn electronic device is in a posture in which a front surface of the display faces the user's gaze or in a posture in which a side surface of the display faces the user's gaze.

The processor according to an example embodiment may be configured to: output AR information in full version mode indicating all information provided in conjunction with the wrist-worn electronic device based on the display of the wrist-worn electronic device being in a posture in which the front surface of the display faces the user's gaze, and output AR information in simple version mode indicating schematic information about the wrist-worn electronic device based on the display (e.g., the display 411 in FIG. 4) of the wrist-worn electronic device being in a posture in which the side surface faces the user's gaze.

The processor according to an example embodiment may be configured to: receive, through the communication module (e.g., the communication module 210 in FIG. 2 or the AR communication module 422 in FIG. 4), a screen configuration information of a watch face image configured as a representative image of the display (e.g., the display 411 in FIG. 4) of the wrist-worn electronic device, monitor watch face images displayed on the display (e.g., the display 411 in FIG. 4) of the wrist-worn electronic device within the camera video, and calculate a tilt or a rotation of the wrist-worn electronic device through deformation information between a feature point of an image stored based on the received screen configuration information and feature points of the monitored watch face images.

The processor according to an example embodiment may be configured to: receive motion sensor information collected in the wrist-worn electronic device from the wrist-worn electronic device through the communication module (e.g., the communication module 210 in FIG. 2 or the AR communication module 422 in FIG. 4), and complement the location, posture, and tilt of the wrist-worn electronic device, based on the motion sensor information of the wrist-worn electronic device.

The processor according to an example embodiment may be configured to: track whether movement of the user's finger or a specific gesture is detected in the camera video shown through the display (e.g., the AR display 421 in FIG. 4), and based on the user's movement selects the output AR information, transmit control information regarding the selected AR information to the wrist-worn electronic device through the communication module (e.g., the camera module 270 in FIG. 2 or the AR camera module 423 in FIG. 4).

The processor according to an example embodiment may be configured to: transmit wear detection information to the wrist-worn electronic device through the communication module (e.g., the camera module 270 in FIG. 2 or the AR camera module 423 in FIG. 4) based on the AR device being worn on the user's body, and transmit detachment detection information to the wrist-worn electronic device through the communication module when the AR device 201 is detached from the user's body.

An electronic device (e.g., the electronic device 101 in FIGS. 1 and 4) according to an example embodiment may include a communication module comprising communication circuitry (e.g., the communication module 190 in FIG. 1 or the communication module 412 in FIG. 4), a display (e.g., the display module 160 in FIG. 1 or the display 411 in FIG. 4), a wear detection sensor (e.g., the sensor module 176 in FIG. 1 or the wear detection sensor 413 in FIG. 4), a memory (e.g., the memory 130 in FIG. 1 or the memory 415 in FIG. 4), and a processor (e.g., the processor 120 in FIG. 1 or the processor 410 in FIG. 4).

The memory may include instructions which, when executed by the processor control the electronic device to: display a watch face image configured as a representative image on the display, transmit marker configuration information about a display form and a display method of a watch face AR marker to an AR device through the communication module, and display, based on the marker configuration information, a watch face AR marker image on the display, based on detecting through the wear detection sensor that the electronic device (e.g., a wrist-worn electronic device) is worn on a user's body, and detecting from the AR device that the AR device is worn on the user's body.

According to an example embodiment, the processor may be configured to display the watch face image configured as the representative image on the display based on a scan rate frame of the display and display the watch face AR marker image within 1 to 5 times per second.

According to an example embodiment, the processor may be configured to control the communication module to transmit the marker configuration information to the AR device through account synchronization with the AR device.

According to an example embodiment, the electronic device may further include: a housing in which the communication module, the display, the wear detection sensor, the memory, and the processor are mounted, and straps configured to be wearable on or detachable from the user's body at both ends of the housing, wherein the straps each include two pattern decorations having a shape or a form for identification in the AR device.

According to an example embodiment, the two pattern decorations may include: a first pattern decoration having a first direction and located at one end connected to the housing, and a second pattern decoration having a second direction and located at another end of the housing, and the first direction and the second direction may have a single axis.

According to an example embodiment, the processor may be configured to transmit screen configuration information of the watch face image configured as the representative image to the AR device through account synchronization.

According to an example embodiment, the electronic device may further include a motion sensor (e.g., the motion sensor 414 in FIG. 4), wherein the processor may be configured to transmit motion sensor information detected by the motion sensor to the AR device.

Figure 7:
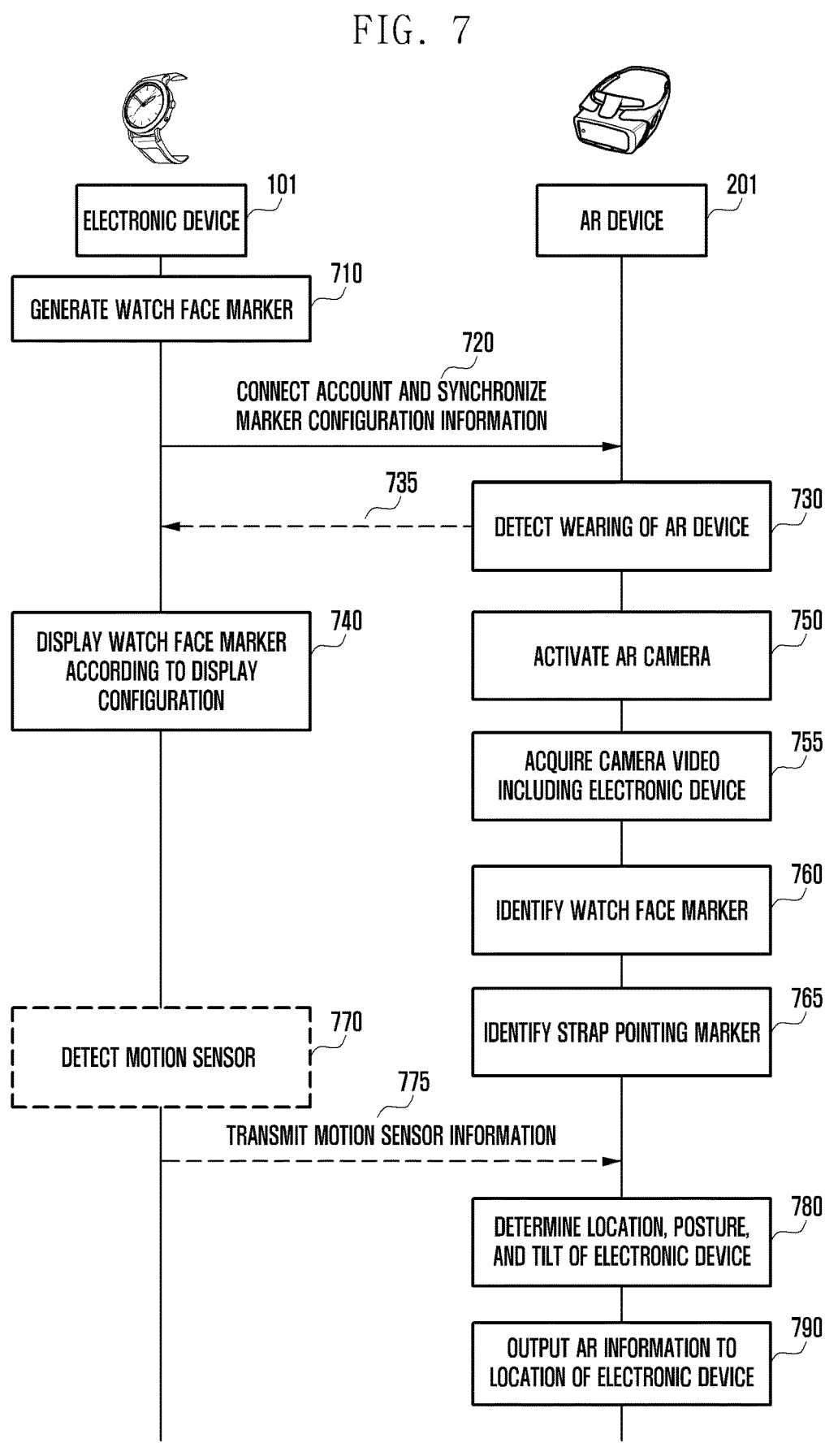

FIG. 7 is a signal flow diagram illustrating an example method of providing AR information using a watch face image in an electronic device and an AR device according to various embodiments. In the following embodiments, each operation may be performed sequentially, but is not necessarily performed sequentially. For example, the order of each operation may be changed, or at least two operations may be performed in parallel.

Referring to FIG. 7, according to an embodiment, an electronic device (e.g., the electronic device 101 in FIGS. 1 and 4) (or the processor 120 or 410 of the electronic device 101) may generate (e.g., configure) a watch face AR marker image in operation 710.

For example, as shown at 501 in FIG. 5, the electronic device 101 may be configured to generate a separate watch face AR marker image, display a watch face image configured as a representative image, and then display the watch face AR marker image only in a designated (specific) frame.

In another example, as shown in 502 in FIG. 5, the electronic device 101 may display, as a representative image, a watch face image including a pattern including marker identification information. In another example, as shown in 503 in FIG. 5, the electronic device 101 may transmit screen configuration information configured as a representative image to an AR device (e.g., the AR device 201 in FIGS. 2, 3, and 4), and may designate a normalized image of a watch face image as an AR marker image.

In operation 720, the electronic device 101 may synchronize marker configuration information through an account connection with the AR device 201.

According to an embodiment, the electronic device 101 may transmit the marker configuration information configured in the electronic device 101 to the AR device 201 through wireless communication.

In operation 730, the AR device 201 (or an AR processor (e.g., the processor 220 in FIG. 2 or the AR processor 420 in FIG. 4) of the AR device 201) may detect wearing of the AR device. For example, the AR device 201 may detect the wearing or detachment of the AR device 201 on or from a user's body, based on sensing information acquired from an AR wear detection sensor (e.g., the AR wear detection sensor 424 in FIG. 4). In operation 735, the AR device 201 may transmit wearing information or detachment information to the electronic device 101. According to various embodiments, operation 735 may be omitted.

In operation 740, the electronic device 101 may control a watch face AR marker image to be displayed on a display (e.g., the display module 160 in FIG. 1 or the display 411 in FIG. 4) according to the display configuration of an AR marker. For example, when a first display method is configured for an AR marker, the electronic device 101 may perform control to display a watch face image configured as a representative image and then output a watch face AR marker image in a specific frame.

According to an embodiment, the electronic device 101 may perform control to display the watch face image configured as the representative image on the display 411 and then display the watch face AR marker image on the display 411 in response to a condition in which AR device wearing information is received from the AR device 201.

In operation 750, the AR device 201 may activate an AR camera (e.g., the camera module 270 in FIG. 2 or the AR camera module 423 in FIG. 4) based on the detection of wearing of the AR device.

In operation 755, the AR device 201 may acquire a camera video including the electronic device 101 from the AR camera module 423. For example, the AR camera module 423 may acquire video information obtained by capturing an image related to a real space corresponding to the field of view of a user wearing the AR device 201, and may transmit the video information to the AR processor (e.g., the processor 220 in FIG. 2 or the AR processor 420 in FIG. 4).

In operation 760, the AR device 201 may identify a watch face AR marker within the camera video, and in operation 765, the AR device 201 may identify a strap pointing marker. Operations 760 and 765 may be performed as one operation.

For example, the AR processor 420 may analyze the camera video based on the marker configuration information transmitted from the electronic device 101, and may track at least one of the AR marker and the strap pointing marker from the camera video. For example, the AR processor 420 may capture a camera video in frame units, and may identify an AR marker and/or a strap pointing marker from a watch face AR marker image or a watch face image using a tracking algorithm using a specific value (e.g., a color or a shape).

In operation 780, the AR device 201 may recognize the electronic device 101 based on the marker identification information included in the AR marker, may identify the location (e.g., coordinate information) of the electronic device 101, and may determine the tilt and posture of the recognized electronic device 101.

For example, the AR processor 420 may determine the tilt and posture of the recognized electronic device 101 in the camera video, based on the identified strap pointing marker information. For example, when two strap pointing markers are recognized in the camera video, the AR processor 420 may determine that the electronic device is in a posture in which the front surface of the electronic device faces the user's gaze, and when one strap pointing marker is recognized, the AR processor 420 may determine that the electronic device is in a posture in which the side surface of the electronic device faces the user's gaze.

In operation 790, the AR device 201 may output, based on the determined posture and tilt of the electronic device, AR information associated with the electronic device to the location (e.g., coordinate information) of the recognized electronic device.

The AR processor 420 may perform control to configure the location (e.g., coordinate information) of the recognized electronic device 101 in the camera video as display coordinates of AR information and to output AR information corresponding to (or suitable for or optimized for) the posture and tilt of the recognized electronic device.

For example, when the front surface of the electronic device 101 faces the user's gaze, the AR processor 420 may perform control to output AR information in full version mode (e.g., first type AR information) indicating detailed information associated with the electronic device 101. When the side surface of the electronic device 101 faces the user's gaze, the AR processor 420 may perform control to output, on the AR display 421 (e.g., AR glasses), AR information in simple version mode (e.g., second type AR information) indicating schematic information.

Additionally, in operation 770, the electronic device 101 may detect motion sensor information from a motion sensor (e.g., the motion sensor 414 in FIG. 4), and in operation 775, the electronic device 101 may transmit the motion sensor information to the AR device 201 in real time. According to various embodiments, operations 770 and 775 may be omitted.

According to various embodiments, when the motion sensor information of the electronic device 101 transmitted from the electronic device 101 is received, the AR processor 420 may supplement marker tracking with the result of analyzing the motion sensor information of the electronic device 101, so that when an AR marker (or the electronic device 101) is outside the camera video, the location and/or posture of the electronic device 101 may be estimated.

Figure 8:
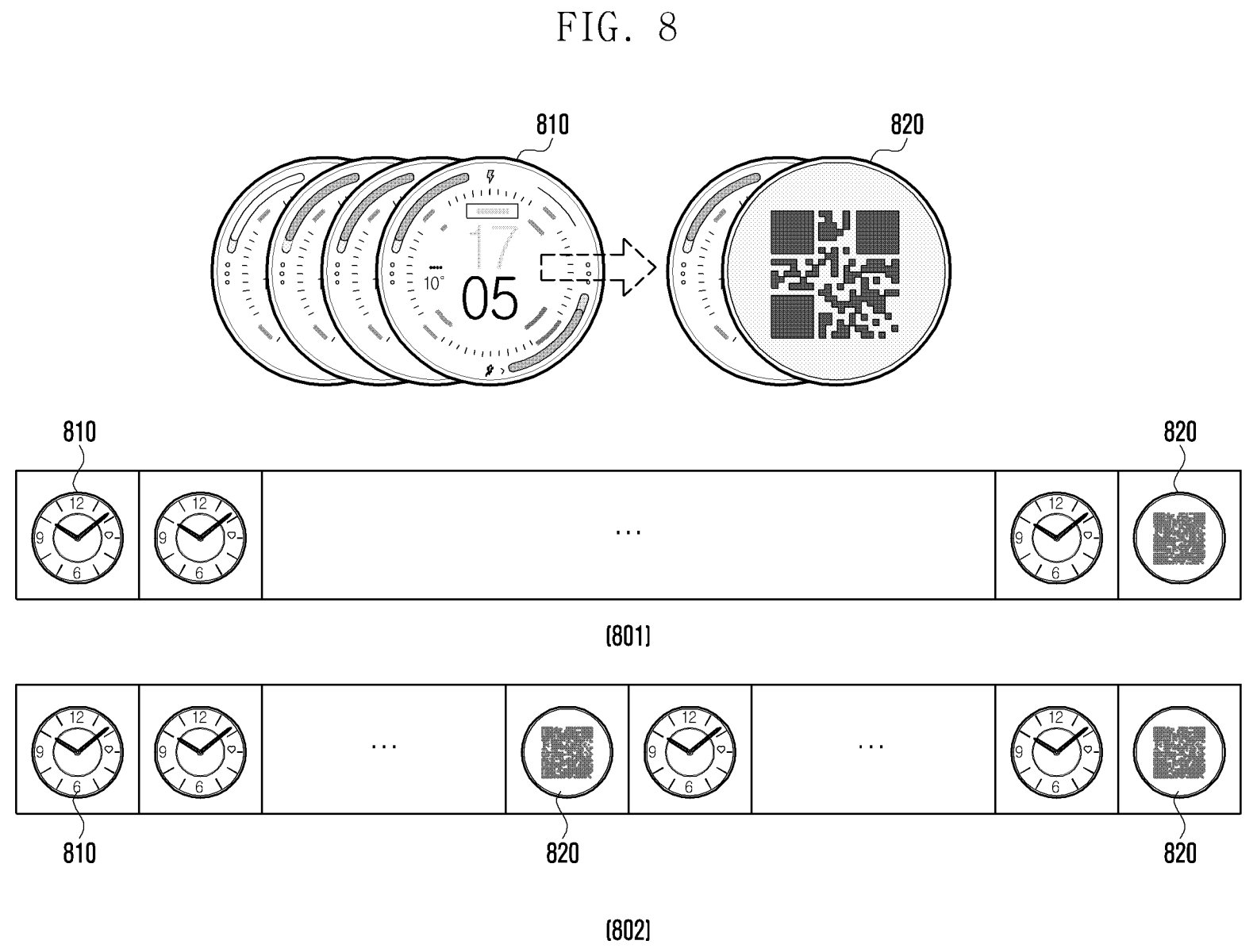

FIG. 8 is a diagram illustrating example screens describing a first display method of a watch face AR marker image in an electronic device according to various embodiments.

Referring to FIG. 8, according to an embodiment, when the display method is configured as a first display method, an electronic device (e.g., the electronic device 101 in FIGS. 1 and 4) may adjust and display, in frame units, a watch face image 810, which has been configured as a representative image, and a watch face AR marker image 820, which has been separately generated.

According to an embodiment, when a display (e.g., the display module 160 in FIG. 1 or the display 411 in FIG. 4) of the electronic device 101 outputs an image at a scan rate (e.g., the number of frames displayed per second) of 60 to 120 Hz, the electronic device 101 may perform control to display the watch face AR marker image 820 in only one or two frames of the scan rate so that an AR device (e.g., the AR device 201 in FIGS. 2, 3, and 4) can identify an AR marker. For example, since a watch face AR marker image is displayed only in 1 to n frames per second, the user cannot visually identify the AR marker image and can view only a watch face image configured as a representative on a display of the AR device.

For example, when it is assumed that the display 411 of the electronic device 101 displays a screen at a scan rate of 60 frames (e.g., 60 Hz) per second, as shown in <801>, the electronic device 101 may control the display 411 to display the watch face image 810 configured as the representative in frames 1 to 59 on a frame-by-frame basis and then display the watch face AR marker image 820 in frame 60.

In another example, as shown in <802>, the electronic device 101 may control the display 411 to display the watch face image 810 configured as the representative in frames 1 to 29 and 31 to 59 on a frame-by-frame basis and then display the watch face AR marker image 820 in frames 30 and 60.

The electronic device 101 may perform control to display the watch face AR marker image 820 in only a few frames of the display scan rate units so that the AR device 201 can identify the AR marker within a range in which the watch face AR marker image 820 is not visible to the user's eyes. In this case, only the watch face image 810 configured as the representative image may be seen by the eyes of the actual user.

Figure 9:
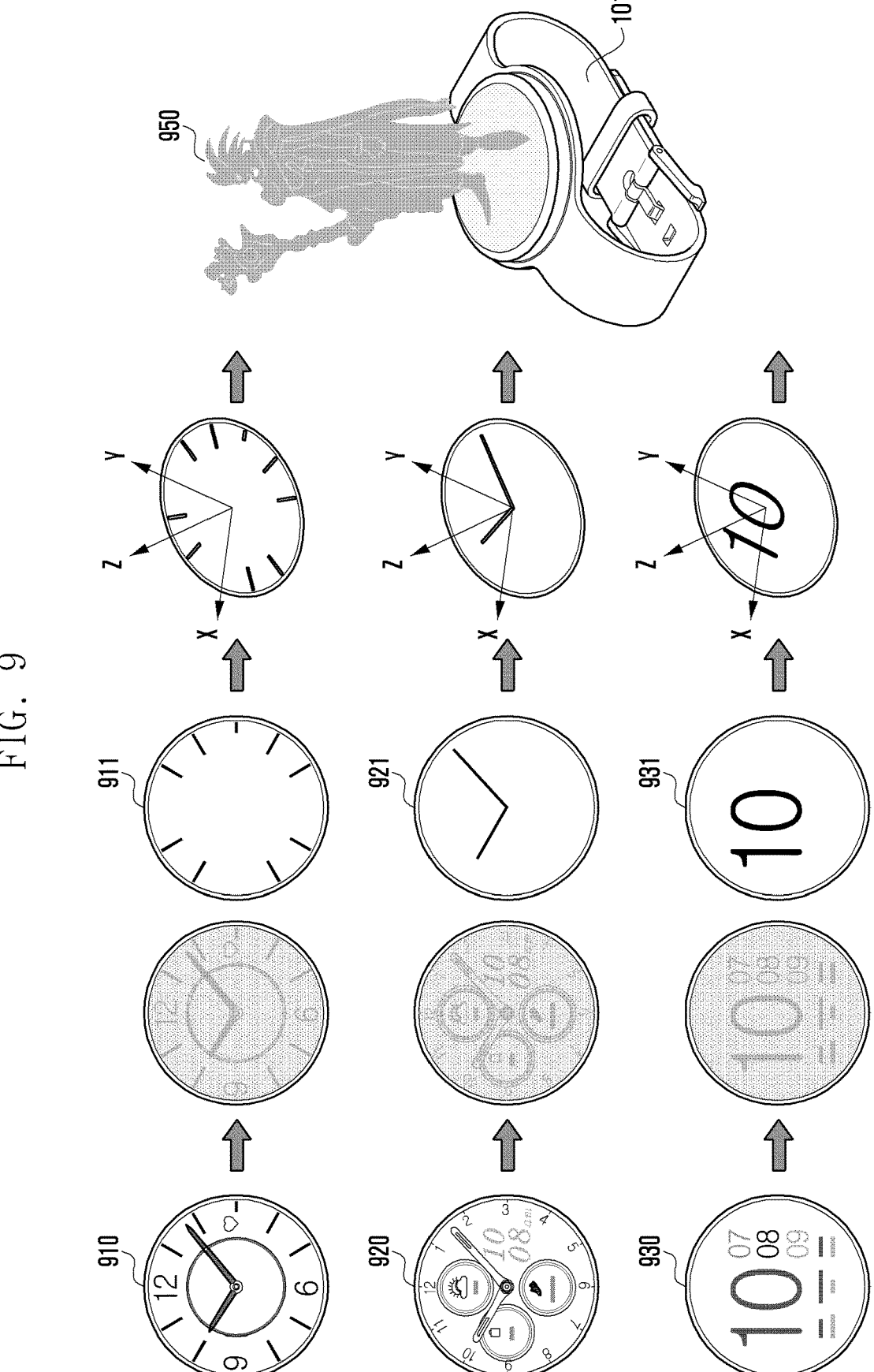
FIG. 9 is a diagram illustrating an example of displaying AR information in the AR device using a watch face image of an electronic device according to various embodiments.

FIG. 9 is a diagram illustrating an example of displaying AR information in the AR device 201 using a watch face image of an electronic device according to various embodiments.

Referring to FIG. 9, a watch face image of an electronic device (e.g., the electronic device 101 in FIGS. 1 and 4) according to an embodiment is designated as an AR marker of an AR device (e.g., the AR device 201 in FIGS. 2, 3, and 4) (e.g., a third display method), the AR device 201 may extract a pattern for identifying markers based on the watch face image of the electronic device 101 in a camera video, calculate an axis for outputting AR information, and then synthesize 3D rendering images to output AR information 950.

For example, the electronic device 101 may designate the form of a first image 910 as a representative image that is to be displayed on a watch face. The electronic device 101 may transmit screen configuration information of the first image 910 configured as the representative image to the AR device 201 through account linkage with the AR device. The AR device 201 may extract a specific point for identifying the first image 910, based on the screen configuration information of the first image 910 transmitted in advance, and extract a normalized image 911 of the first image 910. The AR device 201 may recognize the electronic device 101 in the camera video by monitoring the camera video based on the normalized image 911 of the first image 910. The AR device 201 may monitor the first image 910 included in the camera video, and may calculate how many degrees the axis of the image has been rotated or tilted based on the degree of deformation of features (e.g., bars indicating time) in the normalized images 911, thereby determining the direction of the electronic device 101 and estimating the posture/tilt of the electronic device 101. In the case in FIG. 9, each feature point may be at an angle rotated by about 32 degrees in the x-axis, about −36.4 degrees in the y-axis, and about −32 degrees in the z-axis. The AR device 201 may output AR information on the electronic device 101, based on the rotated angle. The AR information may be displayed based on the identified location and degree of rotation of the electronic device 101, and when the electronic device 101 is moved, the display location of the AR information may also be moved with the movement of the electronic device 101.

In the case of a second image 920 without bars indicating time, the AR device 201 may extract a normalized image 921 of the second image 920 having the hour hand and the minute hand as feature points, and analyze the degree of deformation of feature point patterns of the hour hand and the minute hand, thereby recognizing the direction of the electronic device 101 and estimating the posture/tilt of the electronic device 101.

Alternatively, in the case of a third image 930 without hour and minute hands and in the case of a digital clock, the AR device 201 may extract a normalized image 931 of the third image 930 based on hour display information that changes only once per hour, and analyze information about deformation of a feature point pattern of the hour display information, thereby recognizing the direction of the electronic device 101 and estimating the posture/tilt of the electronic device 101.

Figure 10:
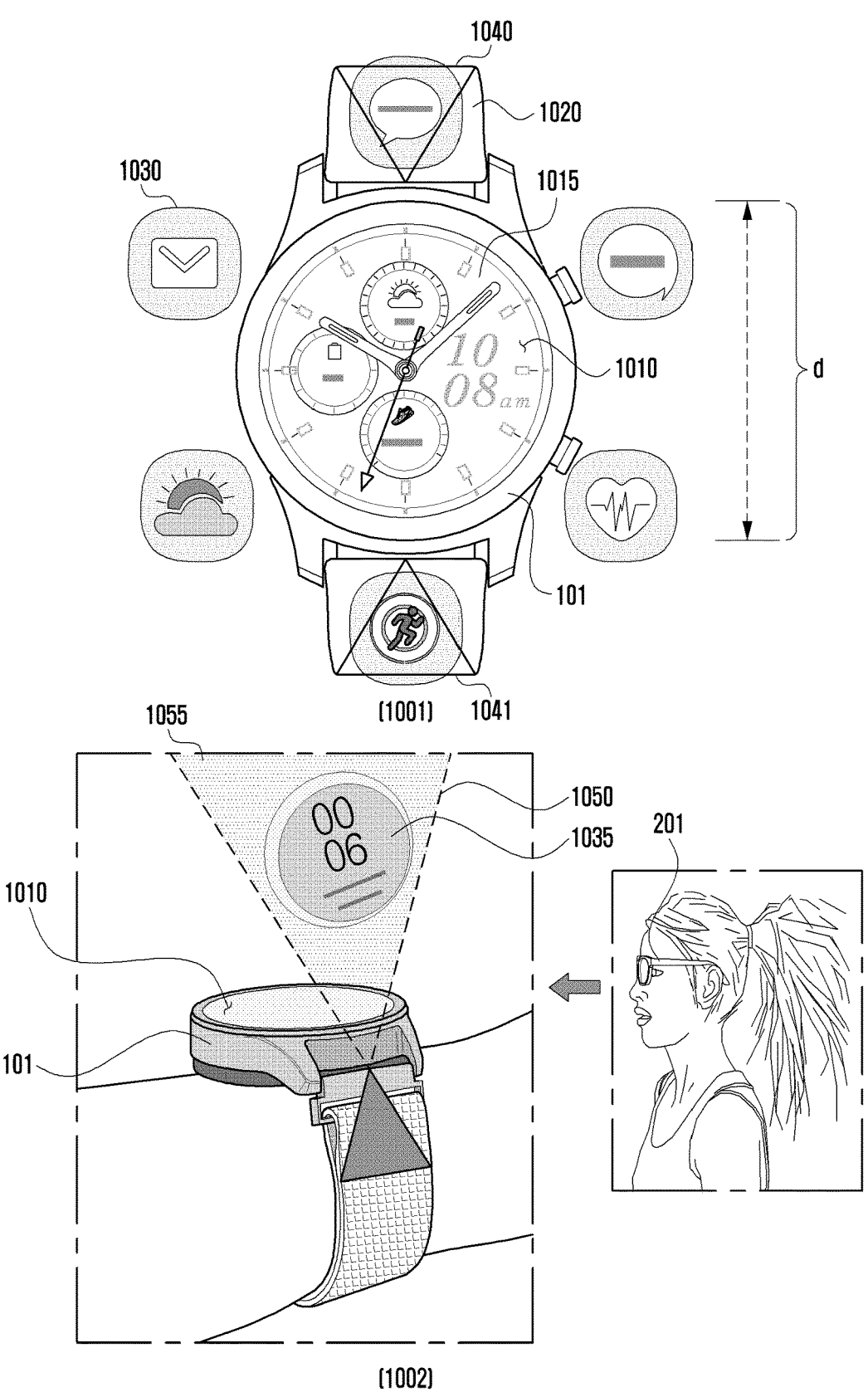
FIG. 10 is a diagram illustrating an example of providing AR information in an AR device according to various embodiments.

FIG. 10 is a diagram illustrating an example of providing AR information in an AR device according to various embodiments.

Referring to FIG. 10, according to an embodiment, an AR device (e.g., the AR device 201 in FIGS. 2, 3, and 4) may perform control to output AR information, which corresponds to (or suitable for or optimized for) the posture and tilt of a recognized electronic device (e.g., the electronic device 101 in FIGS. 1 and 4), together with a camera video through an AR display. The electronic device 101 may be displaying a watch face image 1015 on a display 1010.

When it is determined, based on a strap pointing marker implemented in a strap 1020 of the electronic device 101, that the front surface of the electronic device 101 faces a user's gaze, the AR device 201 may perform control to output, as shown in <1001>, AR information in full version mode (e.g., first type AR information 1030) indicating detailed information associated with the electronic device 101. For example, when two strap pointing markers 1040 and 1041 are recognized in the camera video, the AR device 201 may determine the distance (d) between the two strap pointing markers, and may display AR information (e.g., function icons of the electronic device) to be output along a circular line with a diameter equal to the distance. The screen configuration of the AR information is only an example and may be provided in various forms.

When it is determined that the side surface of the electronic device 101 faces the user's gaze, as shown in <1002>, the AR device 201 may perform control to output, on the AR display 421 (e.g., AR glasses), AR information in simple version mode (e.g., second type AR information 1035) indicating schematic simple information. For example, when one strap pointing marker is recognized in the camera video, the AR device 201 may control AR information to be output as coordinates between imaginary extension lines 1050 and 1055 of two sides of the recognized strap pointing marker as coordinates. The simple version of AR information may include schematic simple information such as time, date, battery information, etc., but is not necessarily limited thereto.

Figure 11:
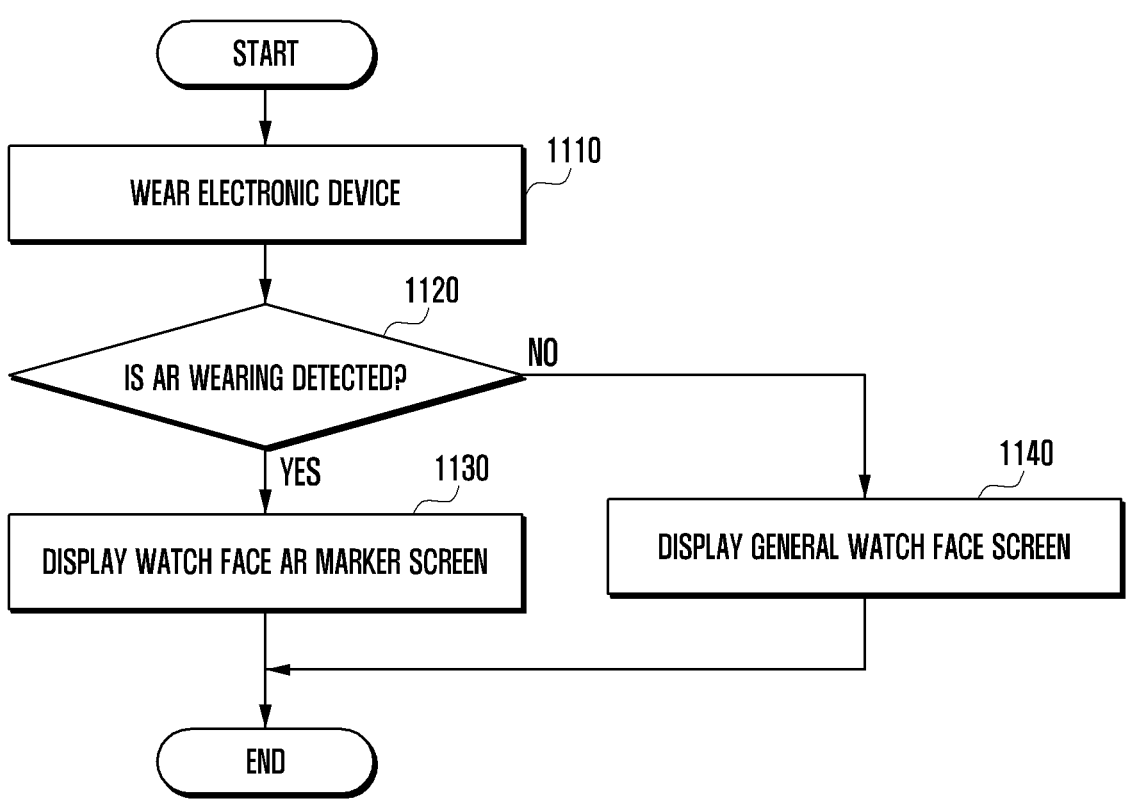
FIG. 11 is a flowchart illustrating an example method for displaying a watch face marker in an electronic device according to various embodiments.

FIG. 11 is a flowchart illustrating an example method for displaying a watch face marker in an electronic device according to various embodiments.

Referring to FIG. 11, an electronic device (e.g., the electronic device 101 in FIGS. 1 and 4) according to an embodiment may support a function of controlling the display of a watch face AR marker image, based on whether an AR device (e.g., the AR device 201 in FIGS. 2, 3, and 4) is worn.

In operation 1110, the electronic device 101 may detect wearing of the electronic device. The electronic device 101 may detect, based on sensor information acquired through a wear detection sensor, whether the electronic device 101 is worn on a user's body.

In operation 1120, the electronic device 101 may determine whether wearing of the AR device 201 is detected. For example, the electronic device 101 may receive AR device wearing detection information or AR device detachment information from the AR device 201. When the AR device wearing detection information is received from the AR device 201, the electronic device 101 may identify wearing of the AR device 201.

In operation 1130, when the wearing of the AR device is detected, the electronic device 101 may control a watch face AR marker image to be displayed on the display 411.

In operation 1140, when the wearing of the AR device is not detected, the electronic device 101 may control a general watch face image configured as a representative image to be displayed on the display 411.

FIG. 12 is a flowchart illustrating an example method for providing AR information using a watch face marker in the AR device 201 according to various embodiments.

Referring to FIG. 12, in operation 1201, a processor (e.g., the processor 220 in FIG. 2 or AR processor 420 in FIG. 4) of an AR device (e.g., the AR device 201 in FIGS. 2, 3, and 4) according to an embodiment may acquire, through account synchronization, marker configuration information related to the display form and/or display method of a watch face marker and configured in an electronic device (e.g., the electronic device 101 in FIGS. 1 and 4).

In operation 1203, the processor 220 or 420 of the AR device 201 may detect that the AR device 201 is worn on a user's body The processor 220 or 420 may detect, based on an AR wear detection sensor, that the AR device 201 is worn on the user's body.

In operation 1205, the processor 220 or 420 of the AR device 201 may acquire a camera video by activating a camera (e.g., the AR camera module 423 in FIG. 4).

In operation 1207, the processor 220 or 420 of the AR device 201 may identify, based on marker configuration information configured in the electronic device, a watch face AR marker and/or a pointing marker included in the camera video.

The processor 220 or 420 may analyze the camera video, based on the marker configuration information transmitted from the electronic device 101, to track at least one of the AR marker and/or the strap pointing marker from the camera video. For example, the processor 220 or 420 may capture the camera video frame by frame, and may identify the AR marker and/or the strap pointing marker from a watch face AR marker image or a watch face image using a tracking algorithm using a specific value (e.g., a color and/or a shape).

In operation 1209, the processor 220 or 420 of the AR device 201 may identify a location and may determine the posture and/or tilt of the electronic device 101.

The processor 220 or 420 may recognize the electronic device 101 based on marker identification information included in the AR marker and may identify the location (e.g., coordinate information) of the electronic device 101.

The processor 220 or 420 may identify the tilt and posture of the electronic device 101 through the strap pointing marker. For example, when two strap pointing markers are recognized in the camera video, the processor 220 or 420 may determine that the electronic device is in a posture in which the front surface of the electronic device faces the user's gaze, and when one strap pointing marker is recognized, the processor 220 or 420 may determine that the electronic device is in a posture in which the side surface of the electronic device faces the user's gaze.

In operation 1211, the processor 220 or 420 of the AR device 201 may output AR information suitable for the location of the electronic device and the posture and/or tilt of the electronic device.

For example, when the front surface of the electronic device 101 faces the user's gaze, the processor 220 or 420 may perform control to output AR information in full version mode (e.g., first type AR information) indicating detailed information associated with the electronic device 101. When the side surface of the electronic device 101 faces the user's gaze, the processor 220 or 420 may perform control to output, on the AR display 421 (e.g., AR glasses), AR information in simple version mode (e.g., second type AR information) indicating schematic information.

A method in which an AR device (e.g., the AR device 201 in FIGS. 2, 3, and 4) according to an example embodiment provides AR information using a watch face image may include: receiving marker configuration information related to a display form and a display method of a watch face AR marker and configured in an electronic device (e.g., the electronic device 101 in FIGS. 1 and 4) from the electronic device. The method according to an example embodiment may include detecting that the AR device is worn on a user's body and activating a camera. The method according to an example embodiment may include identifying a watch face AR marker and a strap pointing marker included in a camera video, based on the marker configuration information configured in the electronic device. The method according to an example embodiment may include determining at least one of a location, a posture, and a tilt of the electronic device, based on the identified watch face AR marker and the identified strap pointing marker. The method according to an example embodiment may include outputting AR information corresponding to the posture or the tilt, based on the location of the electronic device.

According to an example embodiment, the electronic device may be a wrist-worn electronic device.

According to an example embodiment, the wrist-worn electronic device may be an electronic device configured to display a watch face image configured as a representative image, based on a scan rate frame of the display, and selectively display a watch face AR marker image within 1 to 5 times per second.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An augmented reality (AR) device comprising:
   a communication module comprising communication circuitry;

a camera;
   a display;
   a wearing detection sensor;
   memory; and
   at least one processor comprising processing circuitry, wherein the memory stores instructions which, when executed by the at least one processor, cause the AR device to:
      receive, through the communication module, marker configuration information related to a display form and a display method of an AR marker from an electronic device;
      detect, through the wearing detection sensor, that the AR device is worn on a body of a user and activate the camera;
      identify, from video obtained by the camera, an AR marker displayed on a display of the electronic device worn by the user and a strap pointing marker, based on the marker configuration information;
      determine a location and a posture or a tilt of the electronic device worn by the user, based on the identified AR marker and the identified strap pointing marker; and
      output AR information corresponding to the posture or tilt with reference to the location of the electronic device worn by the user,
   wherein instructions stored in the memory, when executed by at least one processor comprising processing circuitry, cause the AR device to adjust, based on the marker configuration information, a scan rate of the camera to be equal to or higher than a scan rate of the display of the electronic device.

2. The AR device of claim 1, wherein the electronic device is a wearable electronic device.

3. The AR device of claim 1, wherein instructions stored in the memory, when executed by at least one processor comprising processing circuitry, cause the AR device to identify, as the AR marker, an AR marker from an AR marker image or a watch face image, and identify, as the strap pointing marker, a strap pointing marker included in a strap of the electronic device worn by the user.

4. The AR device of claim 3, wherein instructions stored in the memory, when executed by at least one processor comprising processing circuitry, cause the AR device to receive the marker configuration information by performing account synchronization with the electronic device through the communication module.

5. The AR device of claim 1, wherein instructions stored in the memory, when executed by at least one processor comprising processing circuitry, cause the AR device to:
   recognize the electronic device worn by the user by analyzing the video obtained by the camera in frame units and identifying, as the AR marker, an AR marker displayed on the display of the electronic device worn by the user, and identify location information of the electronic device worn by the user; and
   identify the posture or tilt of the electronic device worn by the user, based on a number of identified strap pointing markers in the video obtained by the camera.

6. The AR device of claim 5, wherein instructions stored in the memory, when executed by at least one processor comprising processing circuitry, cause the AR device to determine whether the display of the recognized electronic device worn by the user is in a posture in which a front surface of the display faces a gaze of the user or in a posture in which a side surface of the display faces the gaze of the user.

7. The AR device of claim 6, wherein instructions stored in the memory, when executed by at least one processor comprising processing circuitry, cause the AR device to:

output AR information in a full version mode indicating all information provided in conjunction with the electronic device worn by the user based on the display of the electronic device being determined to be in the posture in which the front surface of the display faces the gaze of the user; and output AR information in a simple version mode indicating schematic information about the electronic device worn by the user based on the display of the electronic device being determined to be in the posture in which the side surface of the display faces the user's gaze.

8. The AR device of claim 1, wherein instructions stored in the memory, when executed by at least one processor comprising processing circuitry, cause the AR device to:

receive, through the communication module, screen configuration information of a watch face image configured as a representative image of the display of the electronic device;

monitor watch face images displayed on the display of the electronic device worn by the user within the video obtained by the camera; and calculate posture or tilt of the electronic device worn by the user through deformation information between a feature point of an image stored based on the received screen configuration information and feature points of the monitored watch face images.

9. The AR device of claim 1, wherein instructions stored in the memory, when executed by at least one processor comprising processing circuitry, cause the AR device to:

receive motion sensor information collected in the electronic device worn by the user from the electronic device through the communication module; and complement the location and, posture or tilt of the electronic device worn by the user, based on the received motion sensor information.

10. The AR device of claim 1, wherein instructions stored in the memory, when executed by at least one processor comprising processing circuitry, cause the AR device to track whether movement of a finger of the user or a specific gesture is detected in the video obtained by the camera, and in response to movement for selecting the output AR information, transmit control information regarding the selected AR information to the electronic device worn by the user through the communication module.

11. The AR device of claim 1, wherein instructions stored in the memory, when executed by at least one processor comprising processing circuitry, cause the AR device to:

transmit wearing detection information to the electronic device through the communication module based on the AR device being worn on the body of the user, and transmit detachment detection information to the electronic device through the communication module based on the AR device being detached from the body of the user.

12. A wearable electronic device comprising:

a communication module comprising communication circuitry;

a display;

a wearing detection sensor;

memory; and at least one processor comprising processing circuitry, wherein the memory stores instructions which, when executed by the at least one processor, cause the wearable electronic device to:

display a watch face image configured as a representative image on the display;

transmit marker configuration information about a display form and a display method of an AR marker to an AR device through the communication module; and display, based on the marker configuration information, an AR marker image on the display, based on detecting through the wearing detection sensor that the wearable electronic device is worn on a body of a user and detecting from the AR device that the AR device is worn on the body of the user, and wherein instructions stored in the memory, when executed by the at least one processor cause the wearable electronic device to control the display to display the watch face image configured as the representative image on the display based on a scan rate frame of the display and display the AR marker image within 1 to 5 times per second.

13. The wearable electronic device of claim 12, wherein instructions stored in the memory, when executed by at least one processor comprising processing circuitry, cause the wearable electronic device to control the communication module to transmit the marker configuration information to the AR device through account synchronization with the AR device.

14. The wearable electronic device of claim 12, further comprising:

a housing in which the communication module, the display, the wearing detection sensor, the memory, and the at least one processor are disposed; and at least one strap configured to be wearable on or detachable from the body of the user provided at both ends of the housing, wherein the at least one strap comprises two pattern decorations having a shape or a form for identification in the AR device.

15. The wearable electronic device of claim 14, wherein the two pattern decorations comprise a first pattern decoration having a first direction and located at a first end connected to the housing, and a second pattern decoration having a second direction and located at a second end of the housing, and wherein the first direction and the second direction are along a same axis.

16. The wearable electronic device of claim 12, wherein instructions stored in the memory, when executed by at least one processor comprising processing circuitry, cause the wearable electronic device to transmit screen configuration information of the watch face image configured as the representative image to the AR device through account synchronization.

17. The wearable electronic device of claim 12, further comprising a motion sensor, wherein instructions stored in the memory, when executed by at least one processor comprising processing circuitry, cause the wearable electronic device to control the communication module to transmit motion sensor information detected by the motion sensor to the AR device.

18. A method for providing AR information by an AR device using a watch face image, the method comprising:

receiving marker configuration information, related to a display form and a display method of an AR marker, from a wearable electronic device;

detecting that the AR device is worn on a body of a user and activating a camera;

identifying, from video obtained by the camera, an AR marker displayed on a display of the wearable electronic device worn by the user and a strap pointing marker, based on the marker configuration information;

determining a location and a posture or a tilt of the wearable electronic device worn by the user, based on the identified AR marker and the identified strap pointing marker; and outputting AR information corresponding to the posture or the tilt, based on the location of the wearable electronic device worn by the user, wherein the method further comprises adjusting, based on the marker configuration information, a scan rate of the camera to be equal to or higher than a scan rate of the display of the wearable electronic device.

19. The method of claim 18, wherein the wearable electronic device is configured to display a watch face image configured as a representative image, based on a scan rate frame of a display, and selectively display an AR marker image within 1 to 5 times per second.

* * * * *